US012725569B1

(12) United States Patent
Watanabe et al.

(10) Patent No.: US 12,725,569 B1
(45) Date of Patent: Sep. 1, 2026

(54) ELECTRONIC DEVICE

(71) Applicant: Innolux Corporation, Miaoli County (TW)

(72) Inventors: Hidetoshi Watanabe, Miaoli County (TW); Kazuyuki Hashimoto, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/318,264

(22) Filed: Sep. 3, 2025

(51) Int. Cl.
*G09G 3/32* (2016.01)

(52) U.S. Cl.
CPC ....... *G09G 3/32* (2013.01); *G09G 2300/0842* (2013.01); *G09G 2300/0861* (2013.01); *G09G 2310/08* (2013.01); *G09G 2320/0233* (2013.01); *G09G 2330/021* (2013.01)

(58) Field of Classification Search
CPC ...... G09G 3/3233; G09G 3/20; G09G 3/3266; G09G 3/3696; G09G 3/32; G09G 3/3688; G09G 3/3225; G09G 3/3648; G09G 3/3258; G09G 3/36; G09G 3/3208; G09G 3/30; G09G 3/3291; G09G 3/3614; G09G 3/3275; G09G 3/3655; G09G 2330/021; G09G 2330/028; G09G 2330/02; G09G 2310/08; G09G 2310/027; G09G 2320/0233; G09G 2320/043; G09G 2320/0223; G09G 2320/0209; G09G 2360/16
See application file for complete search history.

(56) References Cited

U.S. PATENT DOCUMENTS

| | | | | |
|---|---|---|---|---|
| 9,978,728 | B2 | 5/2018 | Lin et al. | |
| 10,084,147 | B2 | 9/2018 | Liu et al. | |
| 10,304,813 | B2 | 5/2019 | Kuo et al. | |
| 10,886,260 | B2 | 1/2021 | Kuo | |
| 11,342,319 | B2 | 5/2022 | Lin et al. | |
| 11,515,271 | B2 | 11/2022 | Hosaka | |
| 11,537,015 | B2 | 12/2022 | Kuo | |
| 11,658,262 | B1 | 5/2023 | Cheng et al. | |
| 11,658,276 | B2 | 5/2023 | Huang et al. | |
| 11,699,690 | B2 | 7/2023 | Shih et al. | |
| 2014/0192037 | A1 * | 7/2014 | Chung ................ | G09G 3/2022 345/82 |

(Continued)

FOREIGN PATENT DOCUMENTS

| | | |
|---|---|---|
| CN | 106991964 | 7/2017 |

*Primary Examiner* — Dong Hui Liang
(74) *Attorney, Agent, or Firm* — JCIPRNET

(57) ABSTRACT

An electronic device is provided. The electronic device includes a first transistor, a second transistor, a third transistor, a fourth transistor, a fifth transistor, a sixth transistor, a seventh transistor, a capacitor, and a current driving unit. The second transistor is coupled to the first transistor, and configured to receive a reference voltage. The capacitor is coupled to the first transistor, and includes a first electrode and a second electrode. The third transistor is coupled to the capacitor, and configured to receive a data signal. The fourth transistor is coupled to the capacitor and the first transistor. The fifth transistor is coupled to the first transistor, and configured to receive a first power source. The sixth transistor is coupled to the capacitor, and configured to receive a reset voltage. The seventh transistor is coupled to the first transistor and the capacitor.

20 Claims, 22 Drawing Sheets

(56) References Cited

U.S. PATENT DOCUMENTS

| | | | | |
|---|---|---|---|---|
| 2016/0041676 | A1* | 2/2016 | Tan | G06F 3/0412 345/173 |
| 2019/0041701 | A1 | 2/2019 | Chen et al. | |
| 2019/0355323 | A1* | 11/2019 | Yamada | G09G 3/3233 |
| 2020/0020271 | A1 | 1/2020 | Watsuda | |
| 2021/0118371 | A1* | 4/2021 | Qing | G09G 3/3233 |
| 2023/0209931 | A1* | 6/2023 | Shim | G09G 3/3233 257/40 |
| 2023/0306908 | A1* | 9/2023 | Kim | G09G 3/3233 |
| 2024/0355279 | A1* | 10/2024 | Lee | G09G 3/3233 |

* cited by examiner

ELECTRONIC DEVICE

BACKGROUND

Technical Field

The disclosure relates a device; particularly, the disclosure relates to an electronic device.

Description of Related Art

In traditional pixel circuits, data programming errors may be caused from IR-drop during a data writing period, and power supply voltage fluctuations caused by emission current may also be caused from IR-drop during a light emitting period, resulting in poor image uniformity.

SUMMARY

The electronic device of the disclosure includes first to seventh transistors, a capacitor, and a current driving unit. The first transistor includes a first terminal, a second terminal, and a control terminal. The second transistor is coupled to the first terminal, and configured to receive a reference voltage. The capacitor is coupled to the control terminal, and includes a first electrode and a second electrode. The third transistor is coupled to the first electrode, and configured to receive a data signal. The fourth transistor is coupled to the second electrode and the second terminal. The fifth transistor is coupled to the first terminal, and configured to receive a first power source. The sixth transistor is coupled to the second electrode, and configured to receive a reset voltage. The seventh transistor is coupled to the first terminal and the first electrode. The current driving unit is coupled to the second terminal and a second power source. During a reset period, a first signal is written into the first electrode, and the reset voltage is written into the second electrode. During a data writing period, a data voltage is written into the first electrode, and the reference voltage is written into the second electrode. During a light emitting period, the first terminal is coupled to the first electrode, and a current flows from the first power source through the current driving unit to the second power source. A voltage value of the first signal is higher than or equal to a maximum voltage value of the data signal.

Based on the above, according to the electronic device of the disclosure, the electronic device may effectively solve the problem of image non-uniformity caused by a voltage drop (IR drop) issue, so as to achieve a good display effect.

BRIEF DESCRIPTION OF THE DRAWINGS

FIG. 4 to FIG. 7A are a plurality of schematic diagrams of a pixel circuit according to various embodiments of the disclosure.

DESCRIPTION OF THE EMBODIMENTS

Figure 1:
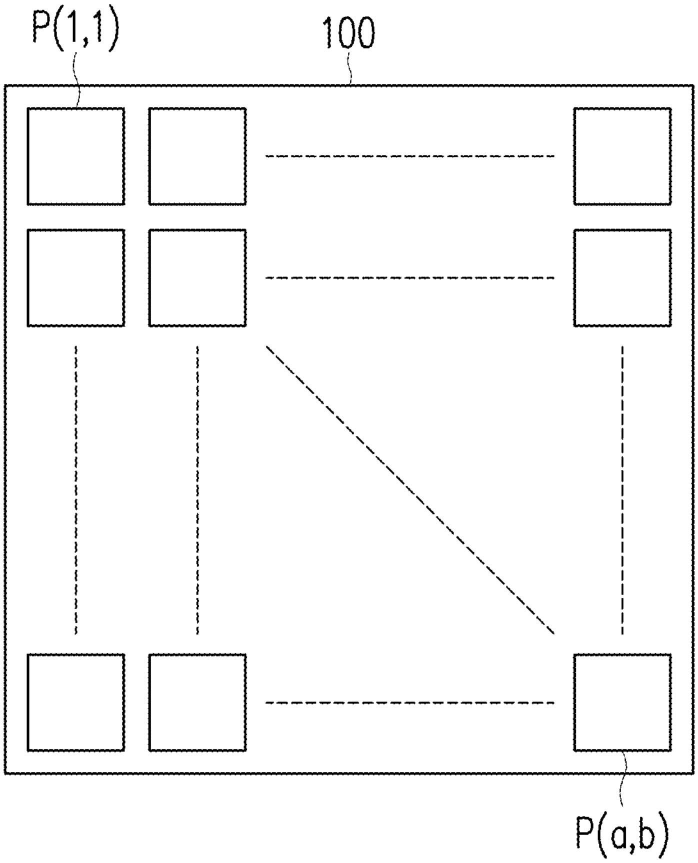
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

FIG. 1 is a schematic diagram of an electronic device according to an embodiment of the disclosure. Referring to FIG. 1, an electronic device 100 may be a display device, and may include a plurality of pixel circuits P(1,1) to P(a,b), where a and b are positive integers. The pixel circuits P(1,1) to P(a,b) form a pixel array, and may be disposed on a substrate. The substrate may be a glass substrate, but the disclosure is not limited thereto. The electronic device 100 may further include a plurality signal lines coupled to the pixel circuits P(1,1) to P(a,b). The electronic device 100 may be a light emitting diode (LED) display device, but the disclosure is not limited thereto. In one embodiment of the disclosure, the electronic device 100 may be an active-matrix light emitting diode (AM-LED) display device, but the disclosure is not limited thereto.

Figure 2A:
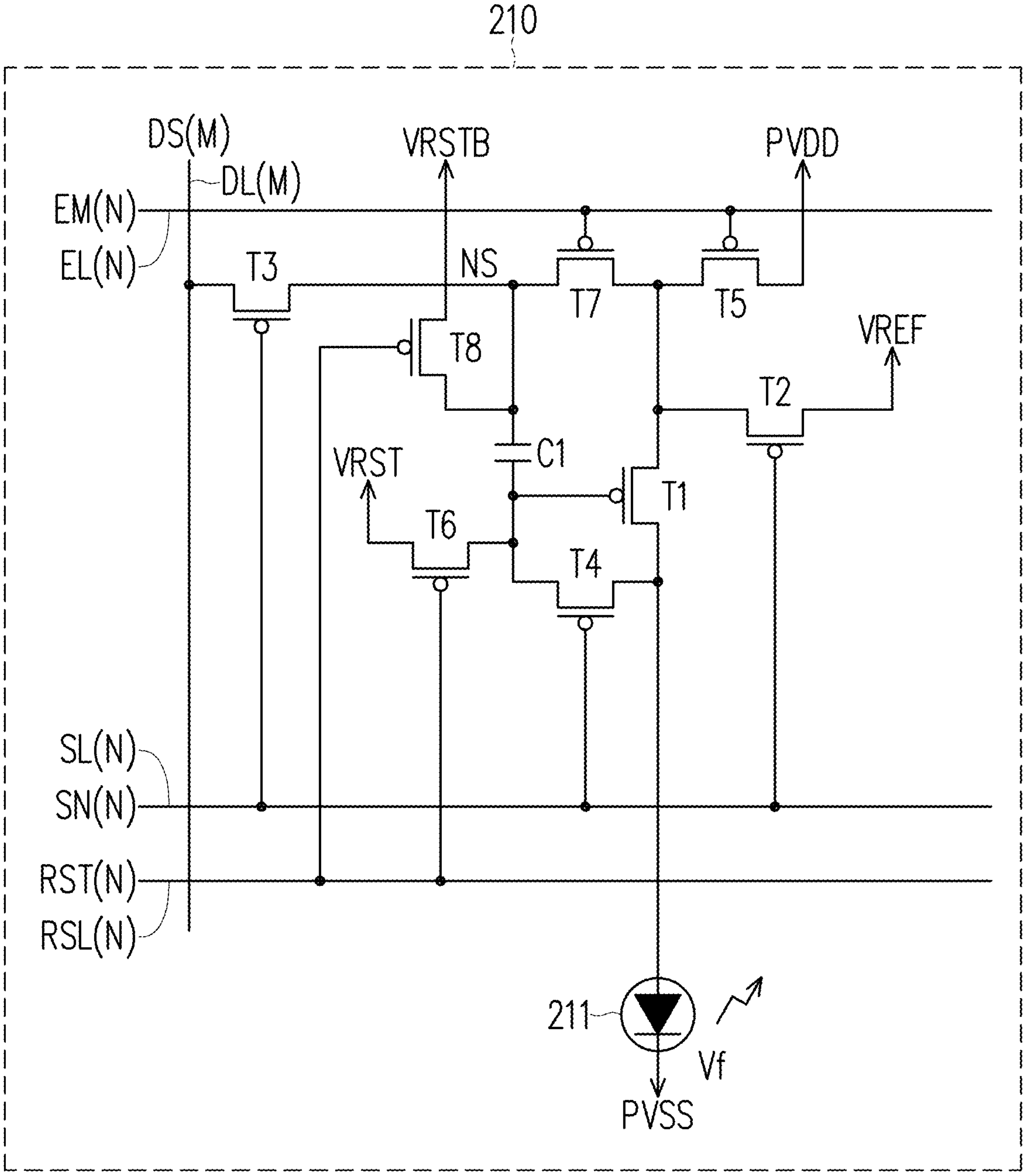
FIG. 2A is a schematic diagram of a pixel circuit according to an embodiment of the disclosure.

FIG. 2A is a schematic diagram of a pixel circuit according to an embodiment of the disclosure. Referring to FIG. 2A, each of the pixel circuits P(1,1) to P(a,b) of FIG. 1 may implement a circuit architecture such as a pixel circuit 210 of FIG. 2A. The pixel circuit 210 may be the (M,N)-th pixel circuit of the pixel circuits P(1,1) to P(a,b) of FIG. 1, where M is a positive integer between 1 to a, and N is a positive integer between 1 to b. The pixel circuit 210 includes first to eighth transistors T1 to T8, a capacitor C1, and a current driving unit 211. The first to eighth transistors T1 to T8 are p-type transistors, but the disclosure is not limited thereto. In one embodiment of the disclosure, at least one of the first to eighth transistors T1 to T8 may be a n-type transistor. The current driving unit 211 may be a light-emitting diode (LED), but the disclosure is also not limited thereto.

Each of the first to eighth transistors T1 to T8 includes a first terminal, a second terminal, and a control terminal. The first terminal and the second terminal of the transistor may be a source terminal and a drain terminal. The control terminal of the transistor may be a gate terminal. The capacitor C1 includes a first electrode and a second electrode. The current driving unit 211 includes a first electrode and a second electrode. The first transistor T1 has the first terminal, the second terminal, and the control terminal. The first terminal of the first transistor T1 may be the source terminal. The second terminal of the first transistor T1 may be the drain terminal, and the second terminal is coupled to the first electrode of the current driving unit 211. The control terminal of the first transistor T1 may be the gate terminal. The first terminal of the second transistor T2 is configured to receive a reference voltage VREF. The second terminal of the second transistor T2 is coupled to the first terminal of the first transistor T1. The control terminal of the second transistor T2 is coupled to a scan signal line SL(N) to receive a scan signal SN(N).

The first electrode of the capacitor C1 is coupled to a first node NS and the second terminal of the eighth transistor T8. The second electrode of the capacitor C1 is coupled to the control terminal of the first transistor T1, the first terminal of the fourth transistor T4, and the second terminal of the sixth transistor T6. The first terminal of the third transistor T3 is coupled to a data signal line DL (M) to receive a data signal DS(M). The second terminal of the third transistor T3 is coupled to the first electrode of the capacitor C1 through the first node NS. The control terminal of the third transistor T3 is coupled to the scan signal line SL(N) to receive the scan signal SN(N). The first terminal of the fourth transistor T4 is coupled to the control terminal of the first transistor T1, the second electrode of the capacitor C1, and the second terminal of the sixth transistor T6. The second terminal of the fourth transistor T4 is coupled to the second terminal of the first transistor T1 and the first electrode of the current driving unit 211. The control terminal of the fourth transistor T4 is coupled to the scan signal line SL(N) to receive the scan signal SN(N). The first terminal of the fifth transistor T5 is coupled to a first power source PVDD. The second terminal of the fifth transistor T5 is coupled to the first terminal of the first transistor T1, the second terminal of the second transistor T2, and the second terminal of the seventh transistor T7. The control terminal of the fifth transistor T5 is coupled to an emission signal line EL(N) to receive an emission signal EM(N).

The first terminal of the sixth transistor T6 is configured to receive a reset voltage VRST. The second terminal of the sixth transistor T6 is coupled to the control terminal of the first transistor T1, the second electrode of the capacitor C1, and the first terminal of the fourth transistor T4. The control terminal of the sixth transistor T6 is coupled to a reset signal line RSL(N) to receive a reset signal RST(N). The reset voltage VRST may be lower than a voltage obtained by subtracting an absolute value of a threshold voltage (Vth) of the first transistor T1 from the reference voltage VREF. The first terminal of the seventh transistor T7 is coupled to the first electrode of the capacitor C1, the second terminal of the third transistor T3, and the second terminal of the eighth transistor T8 through the first node NS. The second terminal of the seventh transistor T7 is coupled to the first terminal of the first transistor T1, the second terminal of the second transistor T2, and the second terminal of the fifth transistor T5. The control terminal of the seventh transistor T7 is coupled to the emission signal line EL(N) to receive the emission signal EM(N). The first terminal of the eighth transistor T8 is configured to receive another reset voltage VRSTB. The second terminal of the eighth transistor T8 is coupled to the first node NS and the first electrode of the capacitor C1. The control terminal of the eighth transistor T8 is coupled to the reset signal line RSL(N) to receive the reset signal RST(N). The another reset voltage VRSTB may be higher than or equal to a maximum voltage value of the data signal DS. The first electrode of the current driving unit 211 is coupled to the second terminal of the first transistor T1 and the second terminal of the fourth transistor T4. The second electrode of the current driving unit 211 is coupled to the second power source PVSS.

Figure 2B:
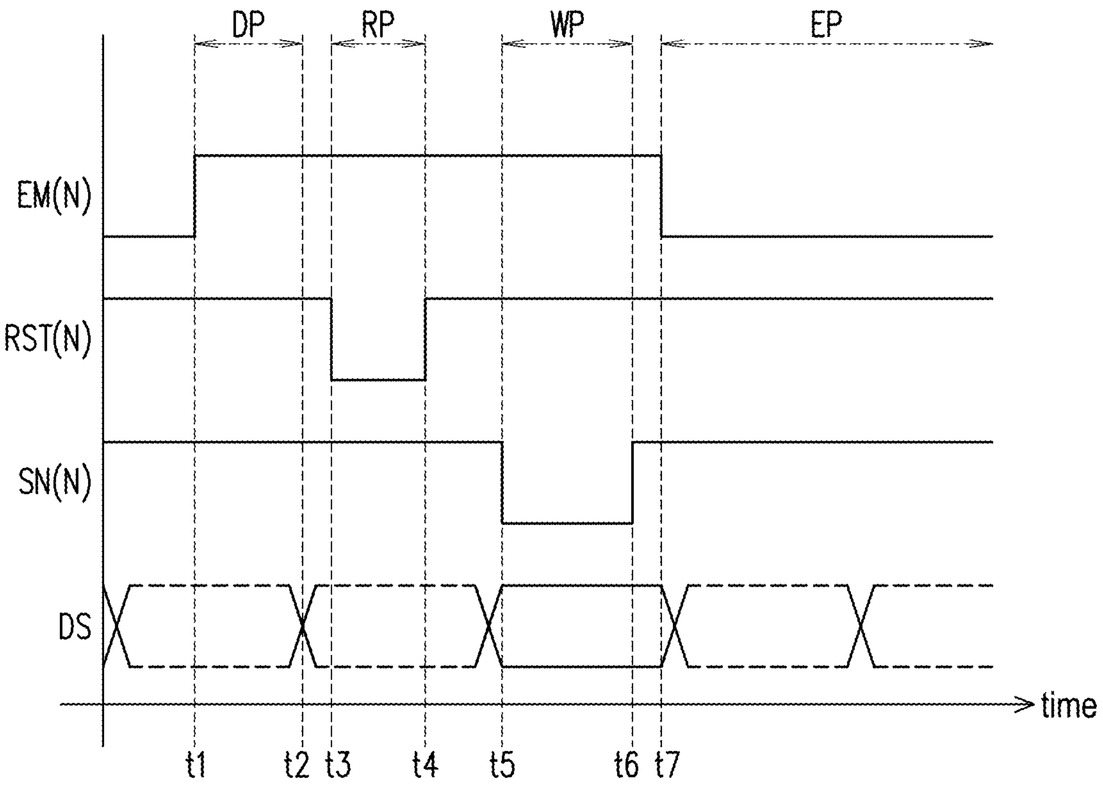
FIG. 2B is a timing diagram of the pixel circuit according to an embodiment of the disclosure.

FIG. 2B is a timing diagram of the pixel circuit according to an embodiment of the disclosure. Referring to FIG. 2A and FIG. 2B, the emission signal EM(N), the reset signal RST(N) and the scan signal SN(N) may be changed between a low voltage level and a high voltage level as shown as FIG. 2B. During a disable period DP from time t1 to time t2, the second to eighth transistors T2 to T8 are turned off, and the current driving unit 211 is also turned off. During a reset period RP from time t3 to time t4, the second to fifth transistors T2 to T5 and the seventh transistor T7 are turned off, and the sixth transistor T6 and the eighth transistor T8 are turned on. Thus, a first signal is written into the first electrode of the capacitor C1, and the reset voltage VRST is written into the second electrode of the capacitor C1. That is, the first electrode of the capacitor C1 is reset to the another reset voltage VRSTB, and the second electrode of the capacitor C1 is reset to the reset voltage VRST. A voltage value of the first signal is higher than or equal to the maximum voltage value of the data signal DS. The another reset voltage VRSTB may be equal to the voltage of the first signal. During a data writing period WP from time t5 to time t6, the fifth to eighth transistors T5 to T8 are turned off, and the second to fourth transistors T2 to T4 are turned on. Thus, a data voltage Vdata of the data signal DS is written into the first electrode of the capacitor C1, and the reference voltage VREF is written into the second electrode of the capacitor C1. The second electrode of the capacitor C1 and the control terminal of the first transistor T1 may receive a voltage equal to the reference voltage VREF plus the threshold voltage (Vth) of the first transistor T1, so as to implement Vth compensation. Moreover, the reference voltage VREF is lower than a forward voltage Vf of the current driving unit 211, thus the current driving unit 211 is still turned off. Therefore, due to the signal written into the capacitor C1 during the data writing period WP does not involve the first power source PVDD, the pixel circuit 210 will not have a programming voltage drop (IR drop) issue.

During a light emitting period EP after time t7 (and before time t1), the second to fourth transistors T2 to T4, the sixth transistor T6, and the eighth transistor T8 are turned off, and the fifth transistor T5 and the seventh transistor T7 are turned on. Thus, a (driving) current Id may flow from the first power source PVDD through the current driving unit 211 to the second power source PVSS. That is, the current Id flows through the first transistor T1 to the current driving unit 211 from the first power source PVDD, and the current Id is determined by the voltage equal to the reference voltage VREF plus the threshold voltage (Vth) of the first transistor T1 minus the data voltage Vdata. More specifically, the current Id may be determined by the following formula (1) and formula (2). In the following formula (1), the symbol Vgs represents a voltage between the first terminal and the control terminal of the first transistor T1. In the following formula (2), the symbol Cox represents an oxide capacitance of the first transistor T1. The symbol u represents a carrier mobility of the first transistor T1. The symbol W represents a width of the first transistor T1. The symbol L represents a length of the first transistor T1. Moreover, the following formula (3) can be derived from formula (1) and formula (2).

$$|Vgs| = |VREF + Vth - Vdata| \quad \text{formula (1)}$$

$$Id = Cox \cdot \frac{u}{2} \cdot \frac{w}{L} \cdot (|Vgs| - Vth)^2 \quad \text{formula (2)}$$

$$Id = Cox \cdot \frac{u}{2} \cdot \frac{w}{L} \cdot (VREF - Vdata)^2 \quad \text{formula (3)}$$

As shown in the above formula (3), the current Id may be determined by the data voltage Vdata and the reference voltage VREF, and the voltage Vgs will not change due to the voltage drop of the first power source PVDD. Therefore, during the light emitting period EP, the pixel circuit 210 will not have an emitting voltage drop issue.

Figure 3A:
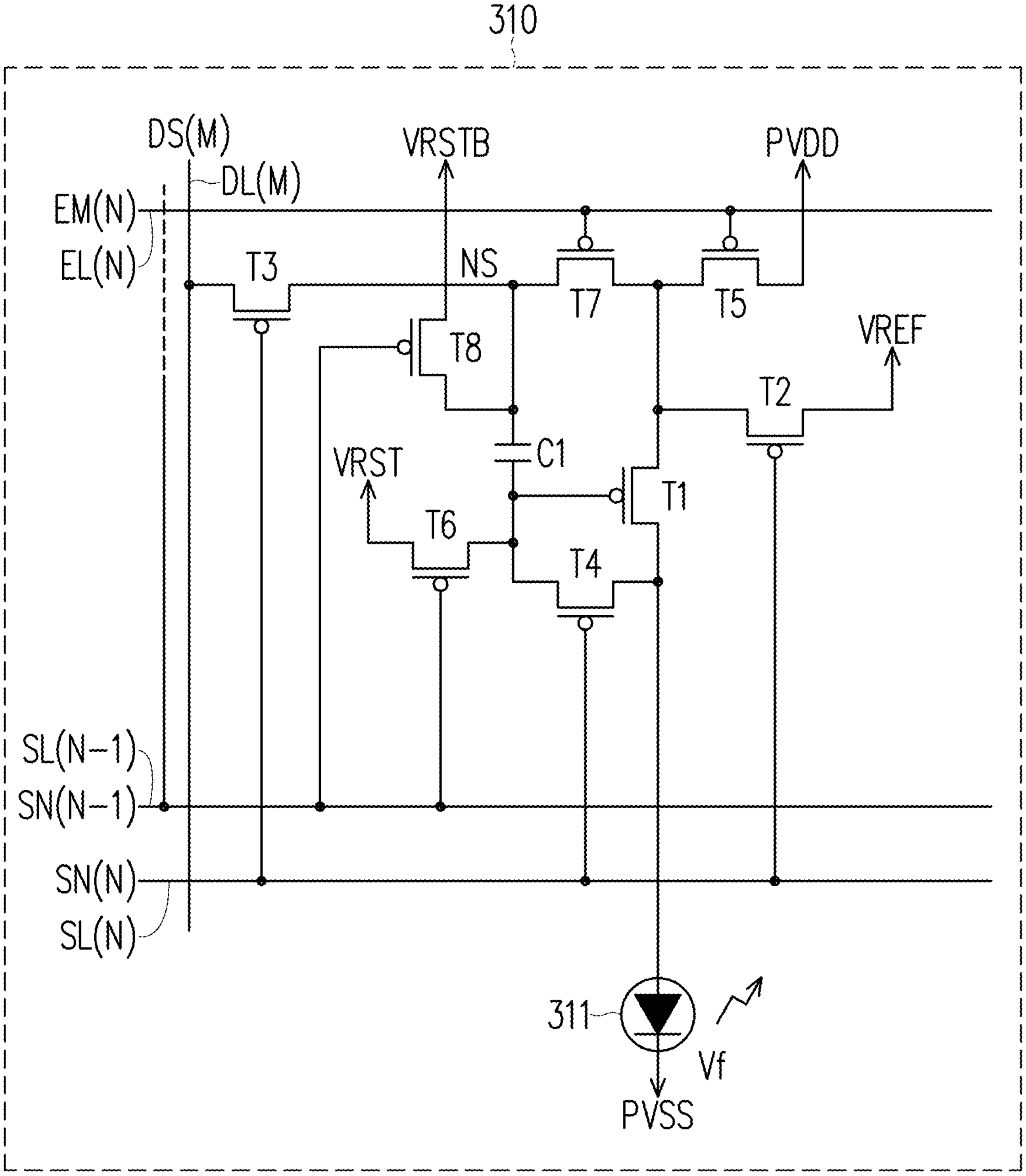
FIG. 3A is a schematic diagram of a pixel circuit according to an embodiment of the disclosure.

FIG. 3A is a schematic diagram of a pixel circuit according to an embodiment of the disclosure. Referring to FIG. 3A, the specific circuit architecture of the pixel circuit 310 may refer to the embodiment of FIG. 2A. Compared with the embodiment of FIG. 2A, the control terminal of the sixth transistor T6 is coupled to another scan signal line SL(N−1) of a previous row pixel (i.e. (N−1) row) to receive another scan signal SN(N−1). The reset voltage VRST may be lower than a voltage obtained by subtracting an absolute value of a threshold voltage (Vth) of the first transistor T1 from the reference voltage VREF. The control terminal of the eighth transistor T8 is coupled to the another scan signal line SL(N−1) of a previous row pixel (i.e. (N−1) row) to receive another scan signal SN(N−1).

Figure 3B:
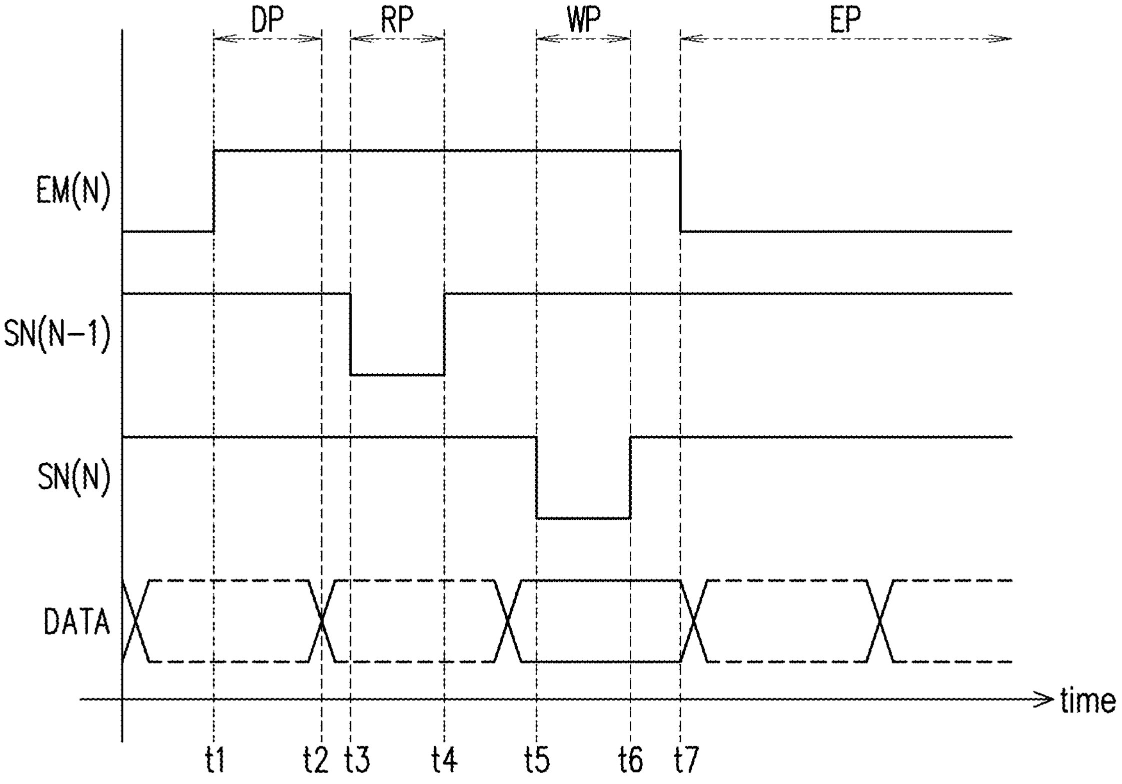
FIG. 3B is a timing diagram of the pixel circuit according to an embodiment of the disclosure.

FIG. 3B is a timing diagram of the pixel circuit according to an embodiment of the disclosure. Referring to FIG. 3A and FIG. 3B, the emission signal EM(N), the scan signal SN(N) and the another scan signal SN(N−1) may be changed as shown as FIG. 3B. During a reset period RP from time t3 to time t4, a first signal is written into the first electrode of the capacitor C1, and the reset voltage VRST is written into the second electrode of the capacitor C1. That is, the first electrode of the capacitor C1 is reset to the another reset voltage VRSTB, and the second electrode of the capacitor C1 is reset to the reset voltage VRST. A voltage value of the first signal is higher than or equal to the maximum voltage value of the data signal DS. The another reset voltage VRSTB may be equal to the voltage of the first signal.

During a data writing period WP from time t5 to time t6, a data voltage Vdata of the data signal DS is written into the first electrode of the capacitor C1, and the reference voltage VREF is written into the second electrode of the capacitor C1. The second electrode of the capacitor C1 and the control terminal of the first transistor T1 may receive a voltage equal to the reference voltage VREF plus the threshold voltage (Vth) of the first transistor T1, so as to implement Vth compensation. Moreover, the reference voltage VREF is lower than a forward voltage Vf of the current driving unit 311, thus the current driving unit 311 is still turned off. Therefore, due to the signal written into the capacitor C1 during the data writing period WP does not involve the first power source PVDD, the pixel circuit 310 will not have a programming voltage drop issue.

During a light emitting period EP after time t7 (and before time t1), a (driving) current Id flows from the first power source PVDD through the current driving unit 311 to the second power source PVSS. That is, the current Id flows through the first transistor T1 to the current driving unit 311 from the first power source PVDD, and the current Id is determined by the voltage equal to the reference voltage VREF minus the data voltage Vdata. More specifically, the current Id may also be determined by the above formula (3).

Figure 4:
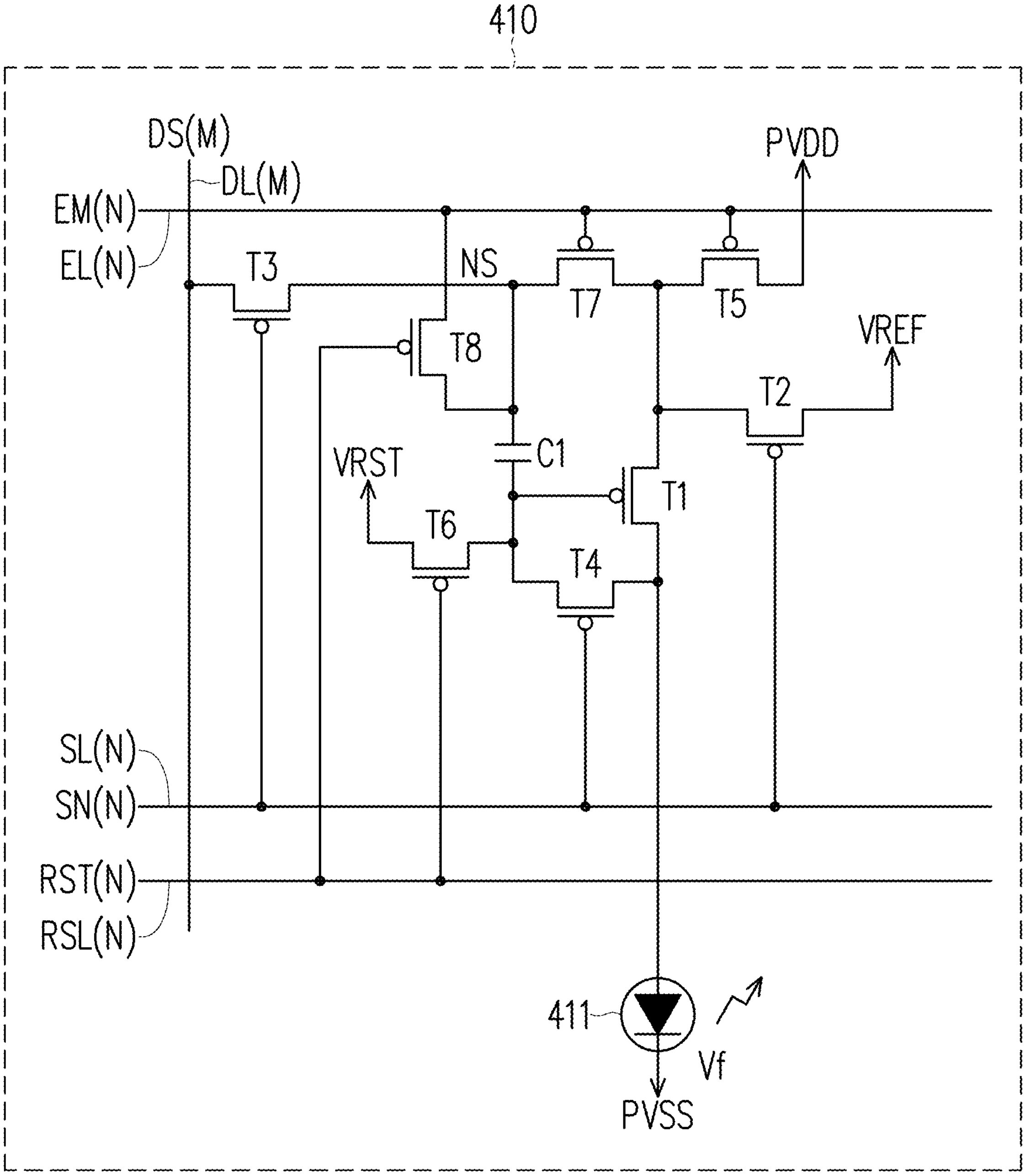

FIG. 4 is a schematic diagram of a pixel circuit according to an embodiment of the disclosure. Referring to FIG. 4, the specific circuit architecture of the pixel circuit 410 may refer to the embodiment of FIG. 2A. Compared with the embodiment of FIG. 2A, the first terminal of the eighth transistor T8 is coupled to the emission signal line EL(N), and configured to receive the emission signal EM(N). In the embodiment of the disclosure, the high voltage level of the emission signal EM(N) is higher than the maximum voltage value of the data signal DS. The pixel circuit 410 may also be operated by the relative signals as shown in FIG. 2B, and can effectively prevent the influence of the voltage drop issue.

Figure 5:
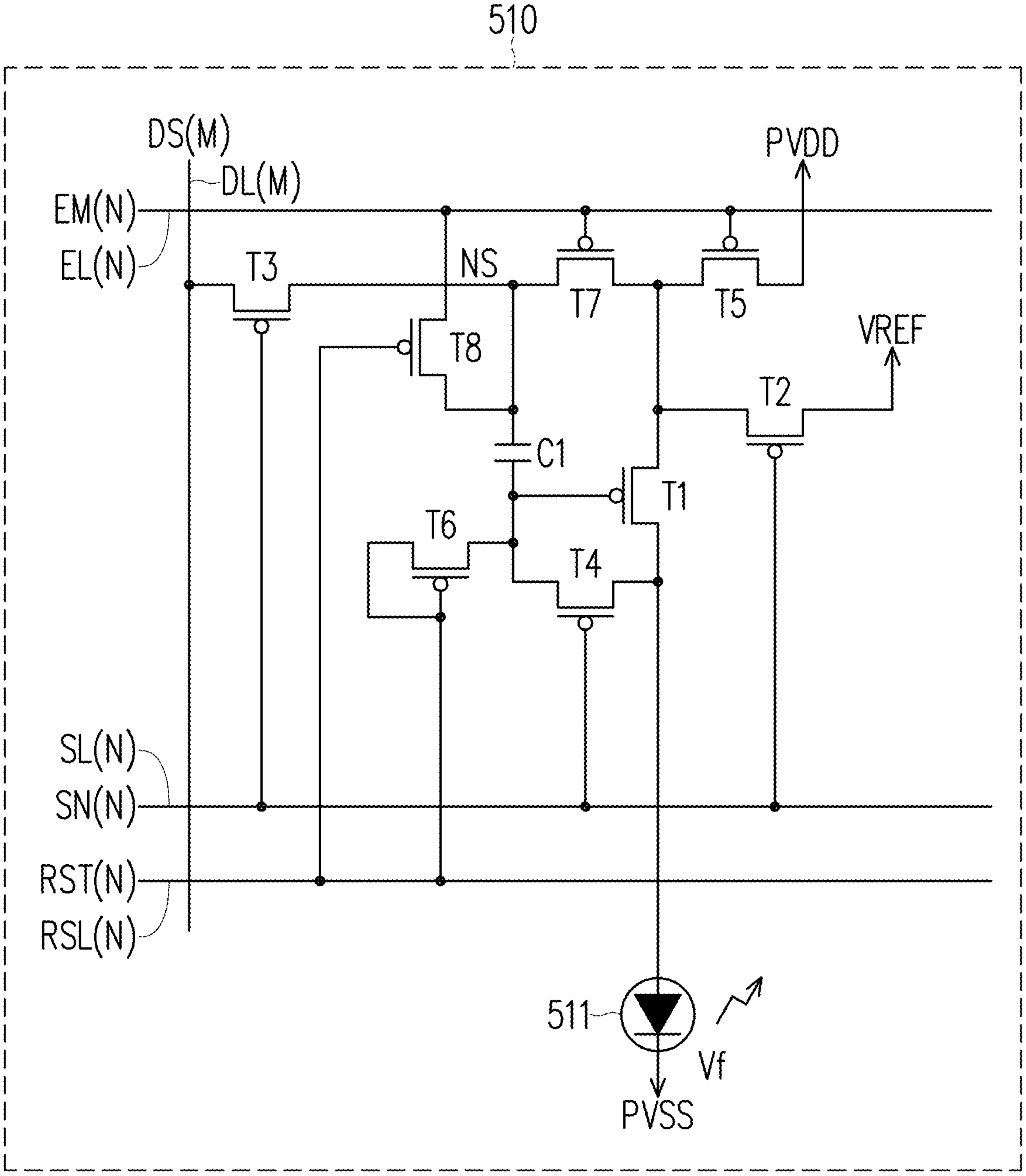

FIG. 5 is a schematic diagram of a pixel circuit according to an embodiment of the disclosure. Referring to FIG. 5, the specific circuit architecture of the pixel circuit 510 may refer to the embodiment of FIG. 2A. Compared with the embodiment of FIG. 2A, the first terminal of the sixth transistor T6 is coupled to the control terminal of the sixth transistor T6. The first terminal of the eighth transistor T8 is coupled to the emission signal line EL(N), and configured to receive the emission signal EM(N). The pixel circuit 510 may also be operated by the relative signals as shown in FIG. 2B, and can effectively prevent the influence of the voltage drop issue.

Figure 6:
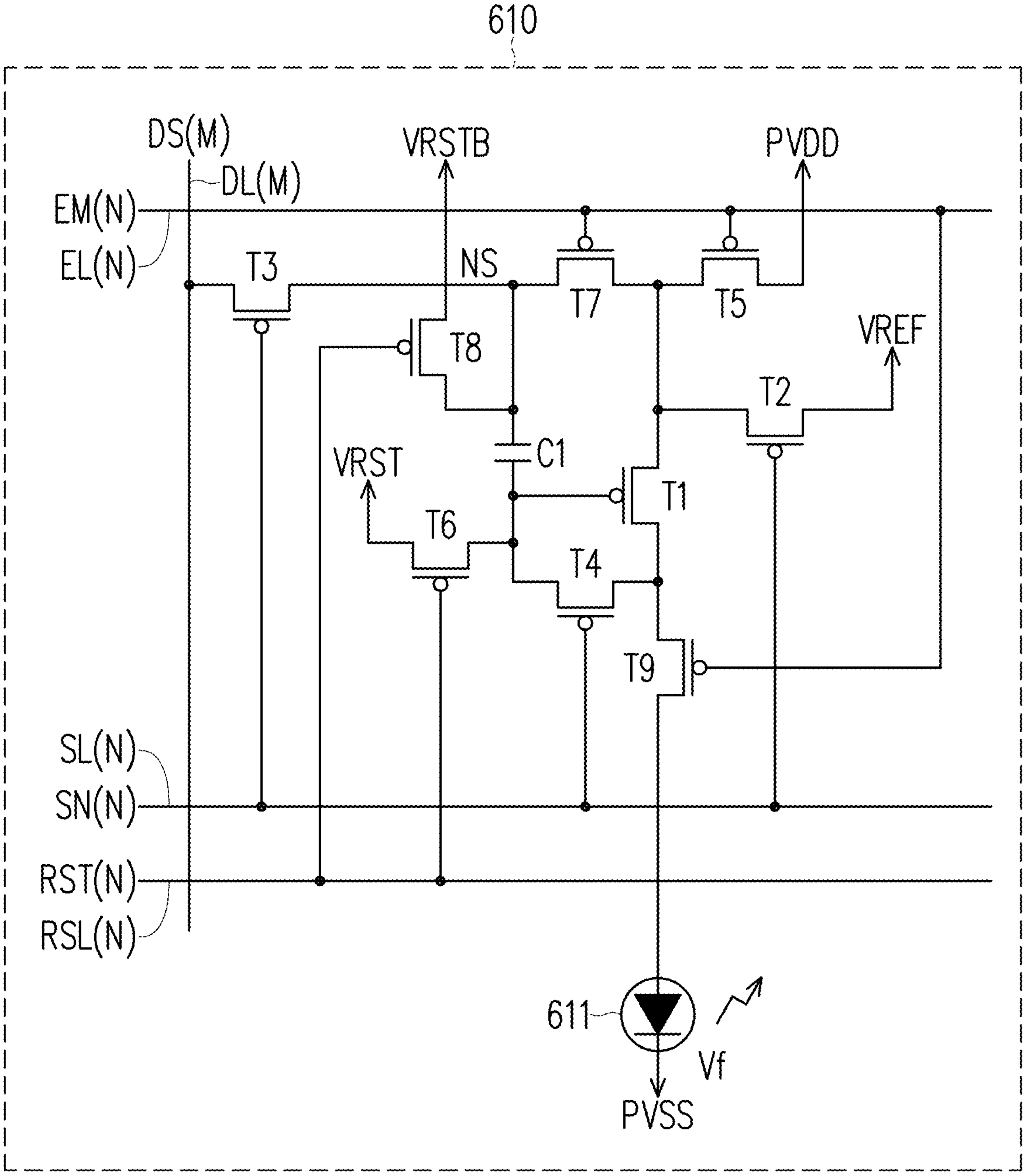

FIG. 6 is a schematic diagram of a pixel circuit according to an embodiment of the disclosure. Referring to FIG. 6, the specific circuit architecture of the pixel circuit 610 may refer to the embodiment of FIG. 2A. The pixel circuit 610 further includes a ninth transistor T9. Compared with the embodiment of FIG. 2A, the first terminal of the ninth transistor T9 is coupled to the second terminal of the first transistor T1 and the second terminal of the fourth transistor T4. The second terminal of the ninth transistor T9 is coupled to the first electrode of the current driving unit 611. The control terminal of the ninth transistor T9 is coupled to the emission signal line EL(N) to receive the emission signal EM(N). The pixel circuit 610 may also be operated by the relative signals as shown in FIG. 2B, and can effectively prevent the influence of the voltage drop issue. It should be noted that, the ninth transistor T9 may effectively prevent a reverse voltage of the current driving unit 611 to obstruct Vth compensation during the reset period RP and the data writing period WP, and may relax the voltage limitation of the reference voltage VREF.

Figure 7A:
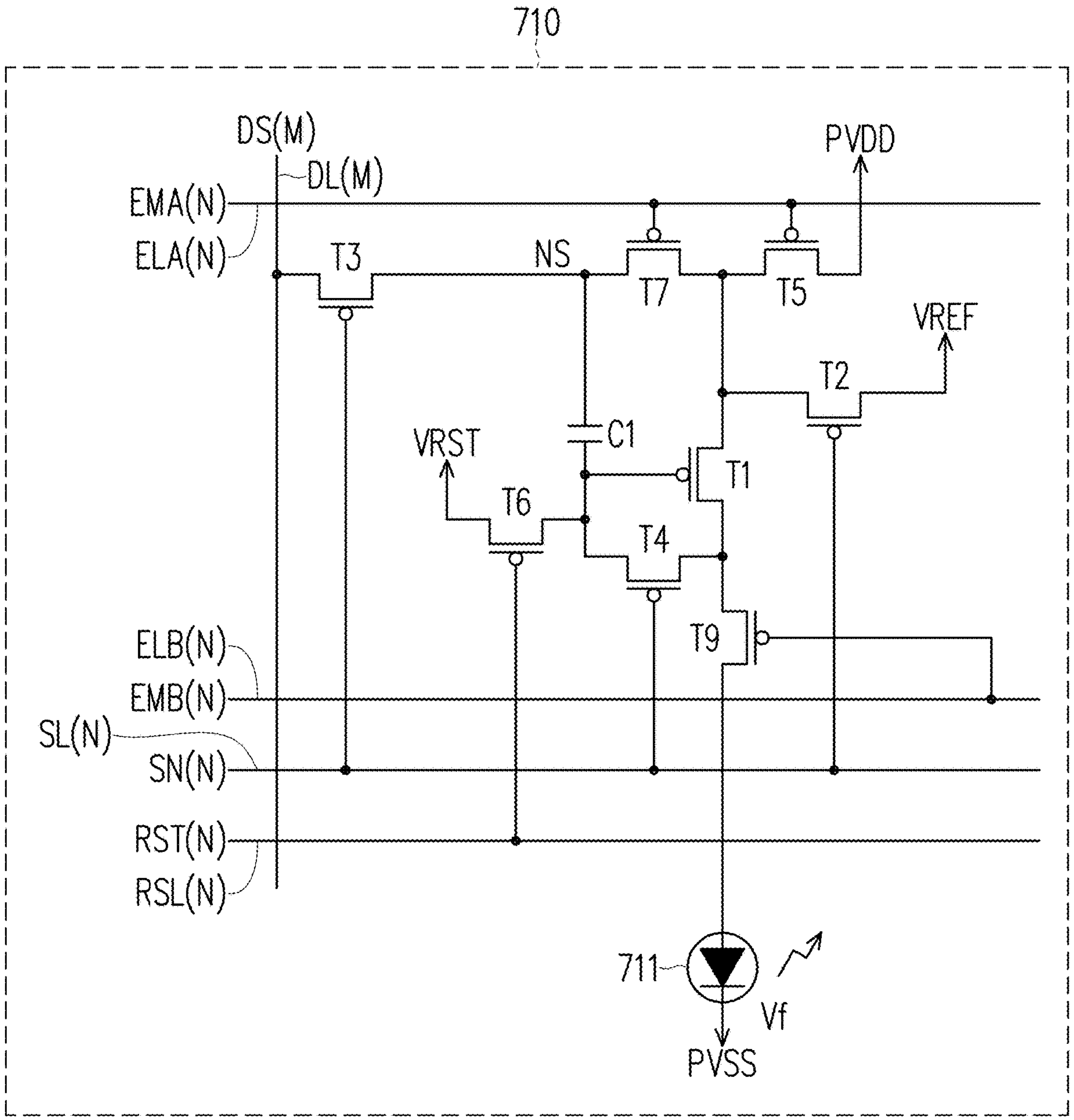

FIG. 7A is a schematic diagram of a pixel circuit according to an embodiment of the disclosure. Referring to FIG. 7A, the specific circuit architecture of the pixel circuit 710 may refer to the embodiment of FIG. 6. The pixel circuit 710 does not include eighth transistor. Compared with the embodiment of FIG. 6, the control terminal of the fifth transistor T5 and T7 are coupled to an emission signal line ELA(N) to receive an emission signal EMA(N), and the control terminal of the ninth transistor T9 is coupled to another emission signal line ELB(N) to receive another emission signal EMB(N).

Figure 7B:
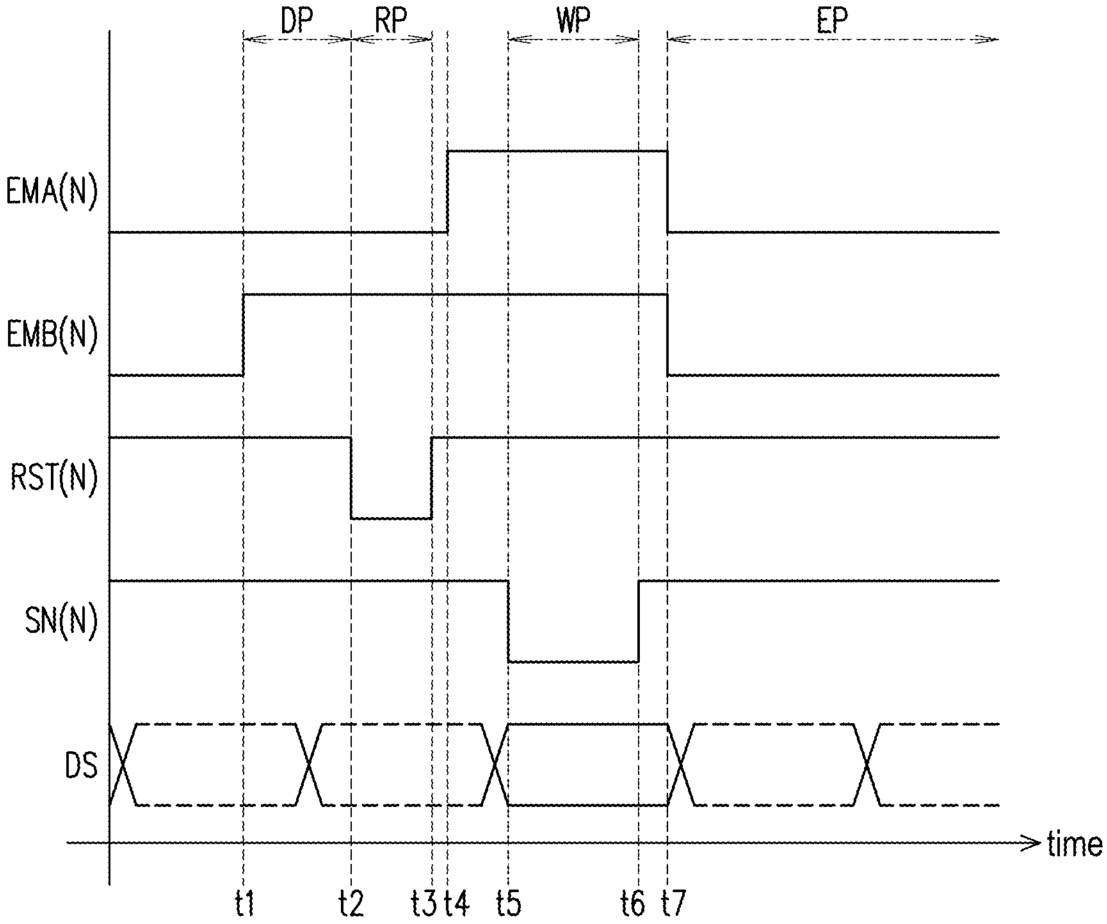
FIG. 7B is a timing diagram of the pixel circuit according to an embodiment of the disclosure.

FIG. 7B is a timing diagram of the pixel circuit according to an embodiment of the disclosure. Referring to FIG. 7A and FIG. 7B, the emission signal EMA(N), the another emission signal EMB(N), the reset signal RST(N) and the scan signal SN(N) may be changed as shown as FIG. 7B. During a reset period RP from time t2 to time t3, a first signal is written into the first electrode of the capacitor C1, and the reset voltage VRST is written into the second electrode of the capacitor C1. That is, the first electrode of the capacitor C1 is reset by the first power source PVDD, and the second electrode of the capacitor C1 is reset to the reset voltage VRST. The first power source PVDD is higher than or equal to the maximum voltage value of the data signal DS. The first power source PVDD may be equal to the voltage of the first signal.

During a writing period WP from time t5 to time t6, a data voltage Vdata of the data signal DS is written into the first electrode of the capacitor C1, and the reference voltage VREF is written into the second electrode of the capacitor C1. The second electrode of the capacitor C1 and the control terminal of the first transistor T1 may receive a voltage equal to the reference voltage VREF plus the threshold voltage (Vth) of the first transistor T1, so as to implement Vth compensation. Moreover, due to the ninth transistor T9 is turned off, the current driving unit 711 is still turned off. Therefore, due to the signal written into the capacitor C1 during the data writing period WP does not involve the first power source PVDD, the pixel circuit 710 will not have a programming voltage drop issue.

During a light emitting period EP after time t7 (and before time t1), a (driving) current Id flows from the first power source PVDD through the current driving unit 711 to the second power source PVSS. That is, the current Id flows through the first transistor T1 and the ninth transistor T9 to the current driving unit 711 from the first power source PVDD, and the current Id is determined by the voltage equal to the reference voltage VREF minus the data voltage Vdata. More specifically, the current Id may also be determined by the above formula (3).

It should be noted that, the ninth transistor T9 may effectively prevent a reverse voltage of the current driving unit 711 to obstruct Vth compensation during the reset period RP and the data writing period WP, and may relax the voltage limitation of the reference voltage VREF.

Figure 8:
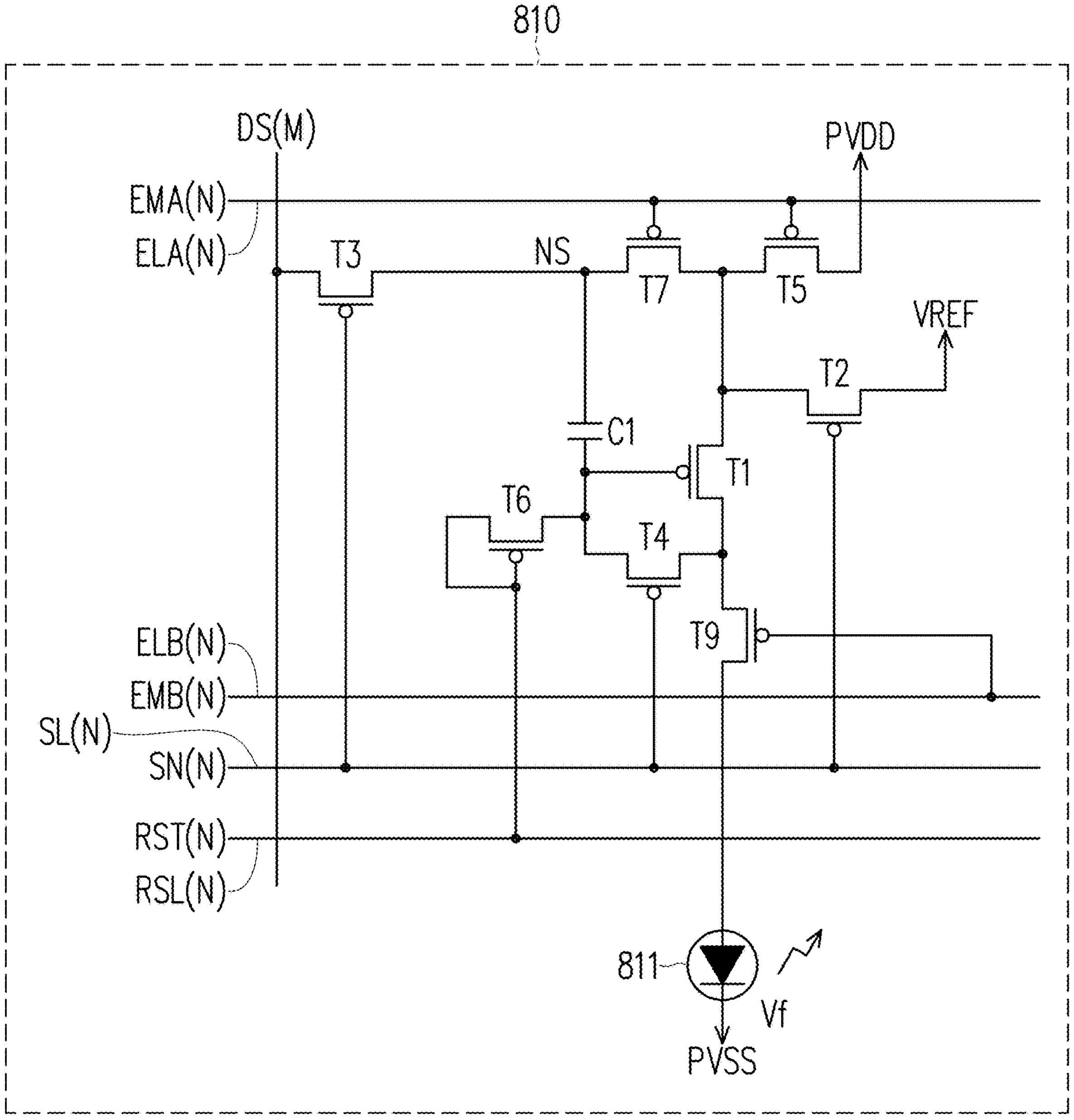
FIG. 8, FIG. 9A and FIG. 10A are a plurality of schematic diagrams of a pixel circuit according to various embodiments of the disclosure.

FIG. 8 is a schematic diagram of a pixel circuit according to an embodiment of the disclosure. Referring to FIG. 8, the specific circuit architecture of the pixel circuit 810 may refer to the embodiment of FIG. 7A. Compared with the embodiment of FIG. 7A, the first terminal of the sixth transistor T6 is coupled to the control terminal of the sixth transistor T6. The pixel circuit 810 may also be operated by the relative signals as shown in FIG. 7B, and can effectively prevent the influence of the voltage drop issue.

Figure 9A:
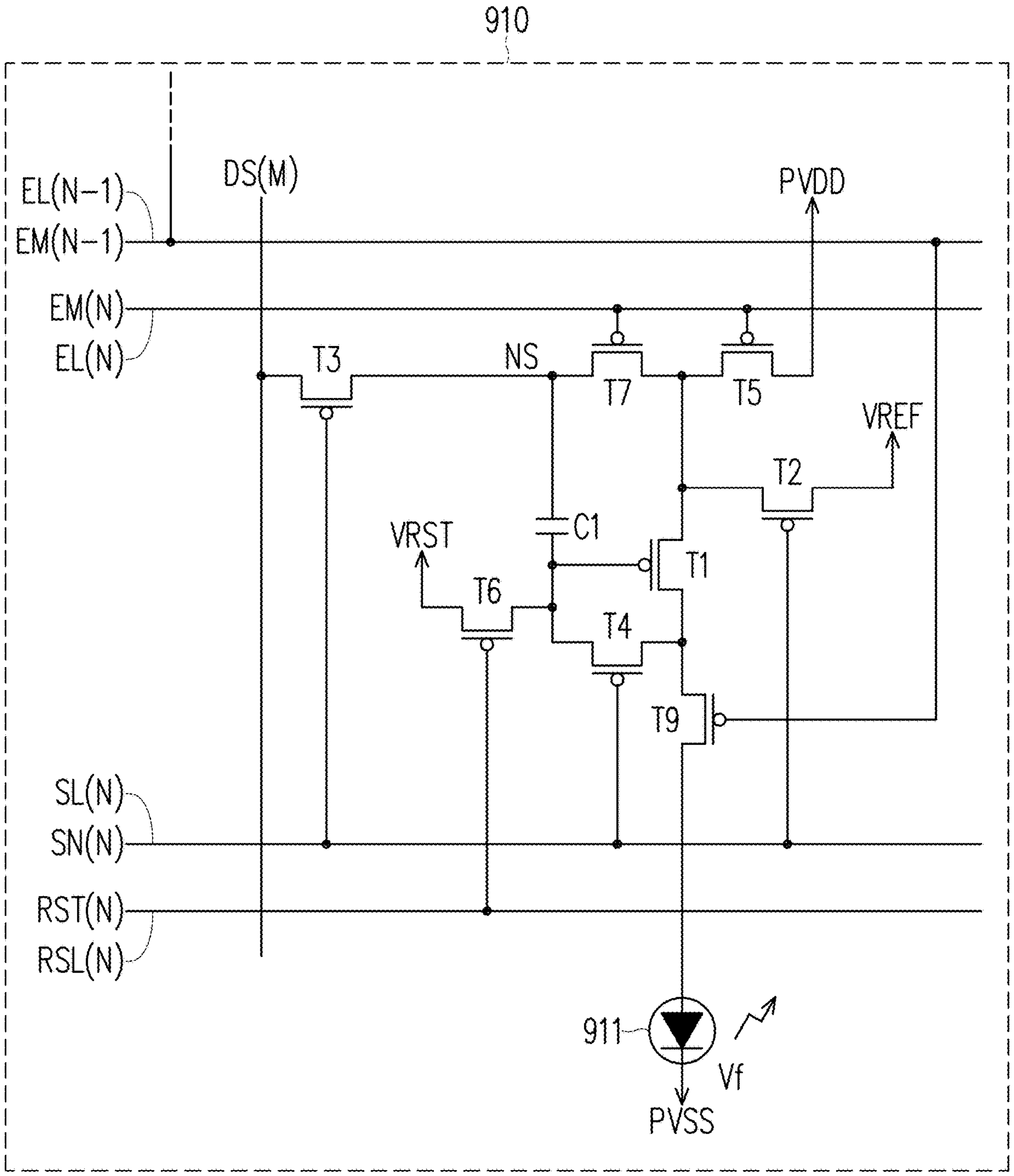

FIG. 9A is a schematic diagram of a pixel circuit according to an embodiment of the disclosure. Referring to FIG. 9A, the specific circuit architecture of the pixel circuit 910 may refer to the embodiment of FIG. 7A. Compared with the embodiment of FIG. 7A, the control terminal of the ninth transistor T9 is coupled to another emission signal line EL(N−1) of a previous row pixel (i.e. (N−1) row) to receive another emission signal EM(N−1).

Figure 9B:
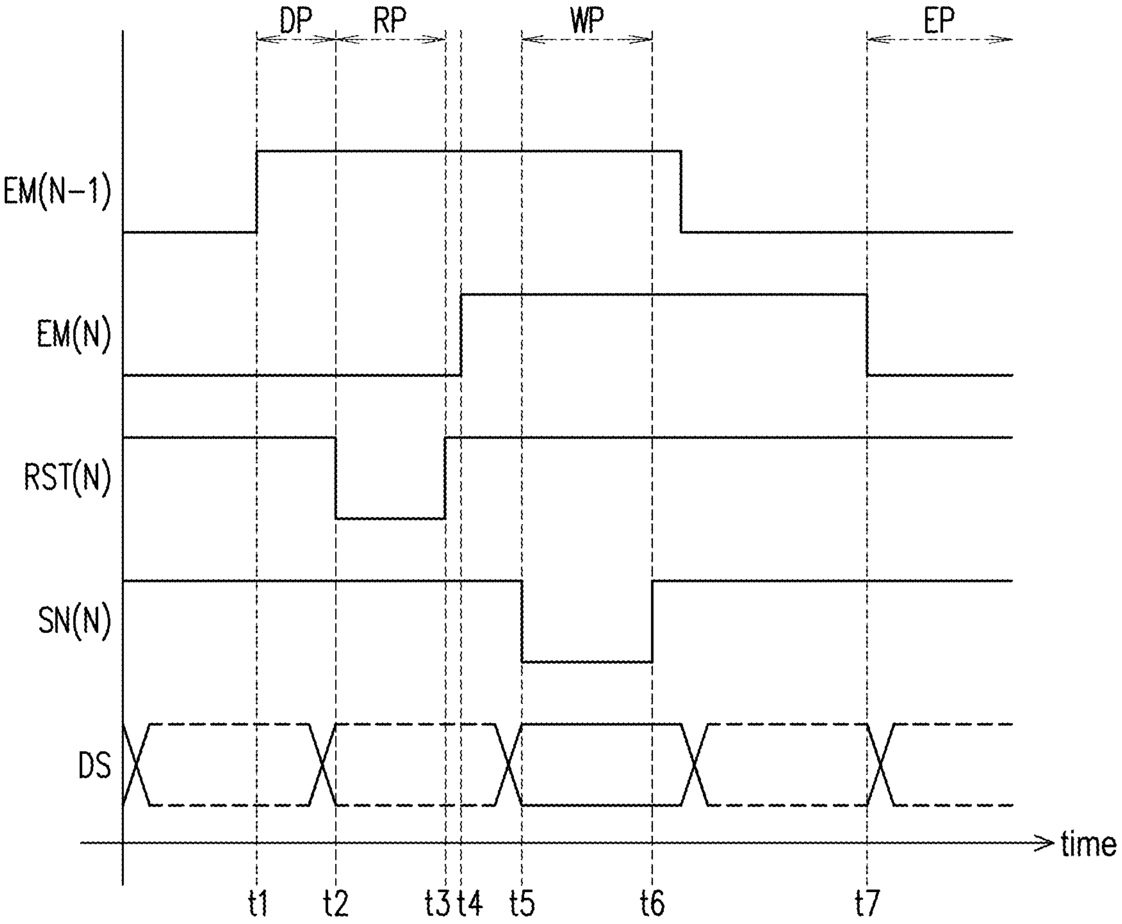
FIG. 9B and FIG. 10B are timing diagrams of the pixel circuit according to an embodiment of the disclosure.

FIG. 9B is a timing diagram of the pixel circuit according to an embodiment of the disclosure. Referring to FIG. 9A and FIG. 9B, the emission signal EM(N), the another emission signal EM(N−1), the reset signal RST(N) and the scan signal SN(N) may be changed as shown as FIG. 9B. During a reset period RP from time t2 to time t3, a first signal is written into the first electrode of the capacitor C1, and the reset voltage VRST is written into the second electrode of the capacitor C1. That is, the first electrode of the capacitor C1 is reset by the first power source PVDD, and the second electrode of the capacitor C1 is reset to the reset voltage VRST. The first power source PVDD is higher than or equal to the maximum voltage value of the data signal DS. The first power source PVDD may be equal to the voltage of the first signal.

During a data writing period WP from time t5 to time t6, a data voltage Vdata of the data signal DS is written into the first electrode of the capacitor C1, and the reference voltage VREF is written into the second electrode of the capacitor C1. The second electrode of the capacitor C1 and the control terminal of the first transistor T1 may receive a voltage equal to the reference voltage VREF plus the threshold voltage (Vth) of the first transistor T1, so as to implement Vth compensation. Moreover, due to the ninth transistor T9 is turned off, the current driving unit 911 is still turned off. Therefore, due to the signal written into the capacitor C1 during the data writing period WP does not involve the first power source PVDD, the pixel circuit 910 will not have a programming voltage drop issue.

During a light emitting period EP after time t7 (and before t1), a (driving) current Id flows from the first power source PVDD through the current driving unit 911 to the second power source PVSS. That is, the current Id flows through the first transistor T1 and the ninth transistor T9 to the current driving unit 911 from the first power source PVDD, and the current Id is determined by the voltage equal to the reference voltage VREF minus the data voltage Vdata. More specifically, the current Id may also be determined by the above formula (3).

Figure 10A:
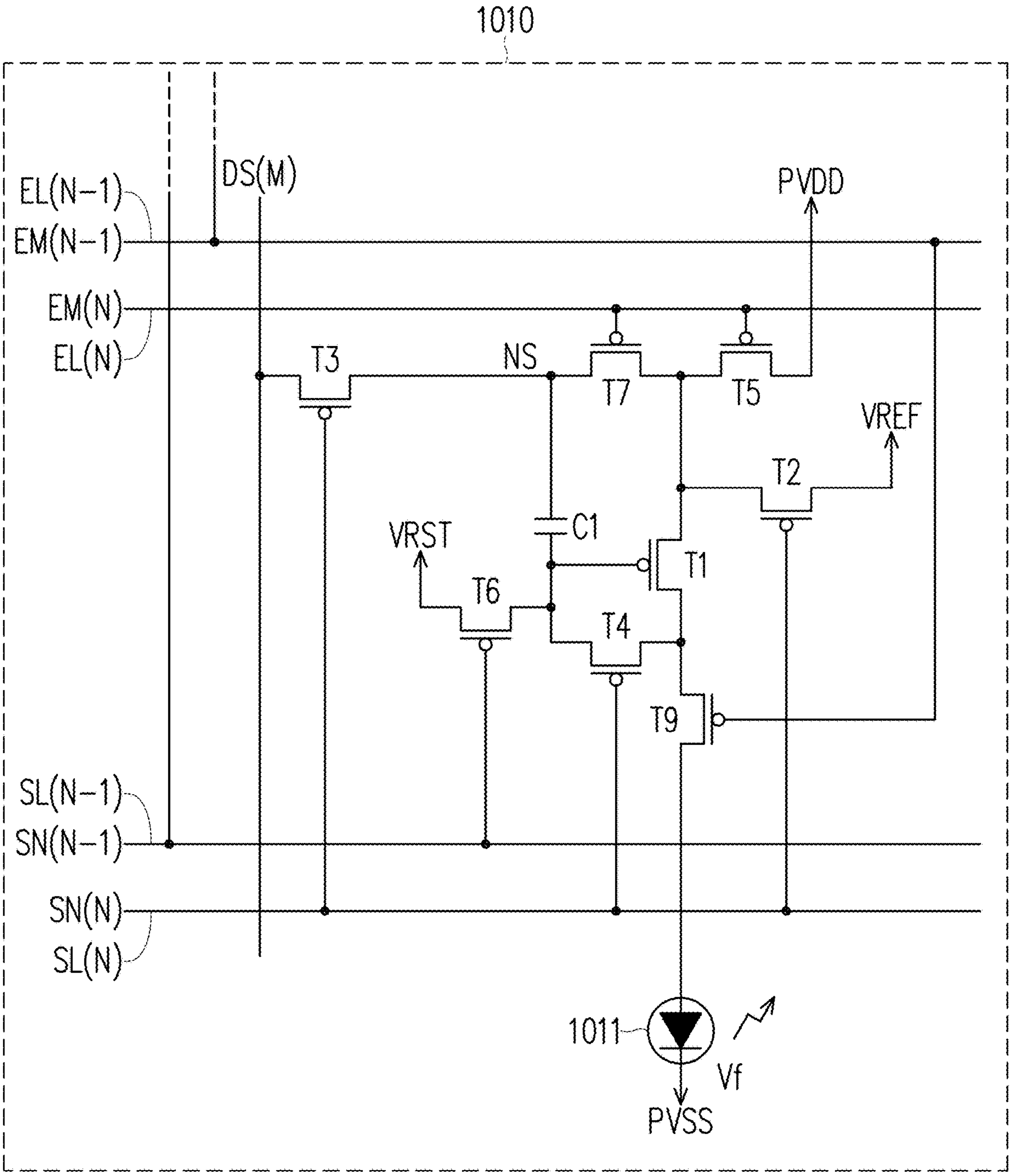

FIG. 10A is a schematic diagram of a pixel circuit according to an embodiment of the disclosure. Referring to FIG. 10A, the specific circuit architecture of the pixel circuit 1010 may refer to the embodiment of FIG. 9A. Compared with the embodiment of FIG. 9A, the control terminal of the sixth transistor T6 is coupled to another scan signal line SL(N−1) of a previous row pixel (i.e. (N−1) row) to receive another scan signal SN(N−1). The reset voltage VRST may be lower than a voltage obtained by subtracting an absolute value of a threshold voltage (Vth) of the first transistor T1 from the reference voltage VREF.

Figure 10B:
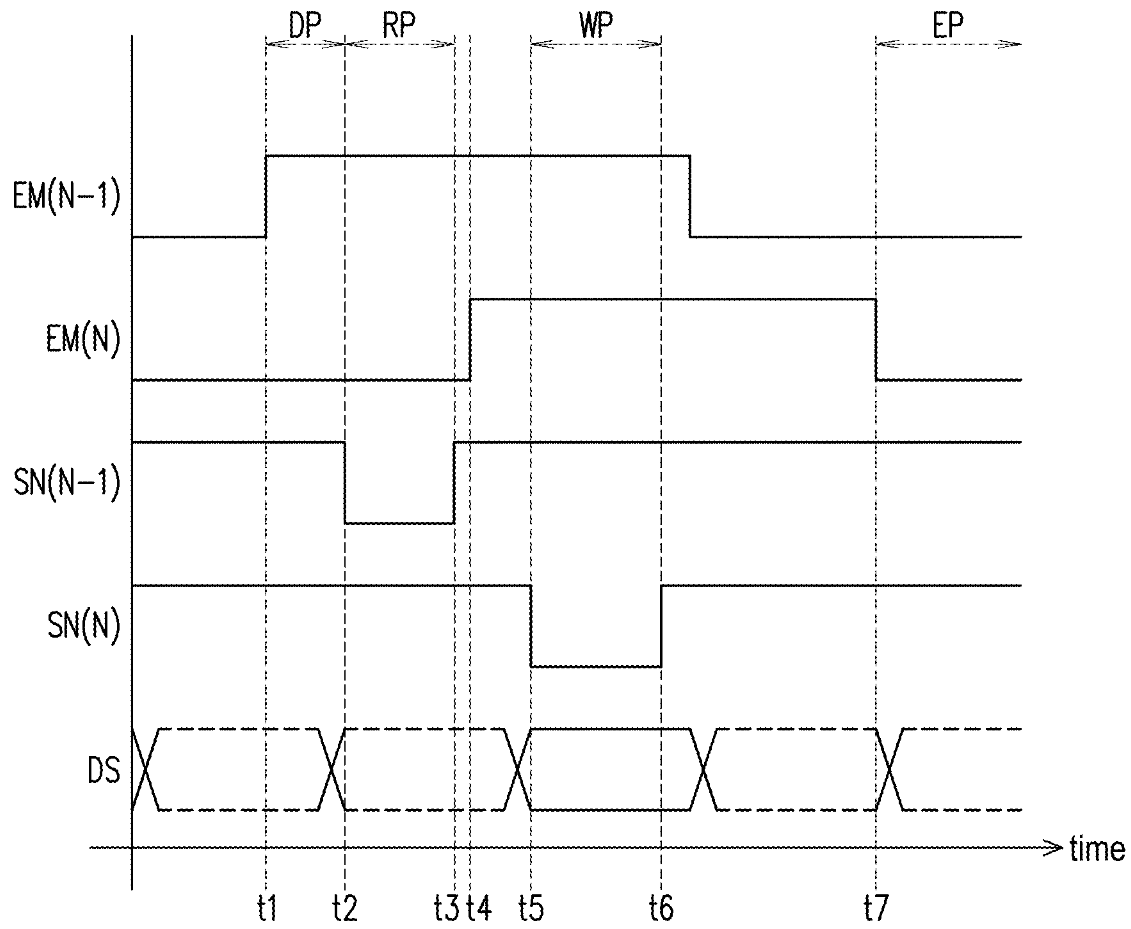

FIG. 10B is a timing diagram of the pixel circuit according to an embodiment of the disclosure. Referring to FIG. 10A and FIG. 10B, the emission signal EM(N), the another emission signal EM(N−1), the scan signal SN(N) and the another scan signal SN(N−1) may be changed as shown as FIG. 10B. During a reset period RP from time t2 to time t3, a first signal is written into the first electrode of the capacitor C1, and the reset voltage VRST is written into the second electrode of the capacitor C1. That is, the first electrode of the capacitor C1 is reset by the first power source PVDD, and the second electrode of the capacitor C1 is reset to the reset voltage VRST. The first power source PVDD is higher than or equal to the maximum voltage value of the data signal DS. The first power source PVDD may be equal to the voltage of the first signal.

During a data writing period WP from time t5 to time t6, the fifth to seventh transistors T5 to T7 and the ninth transistor T9 are turned off, and the second to fourth transistors T2 to T4 are turned on. Thus, a data voltage Vdata of the data signal DS is written into the first electrode of the capacitor C1, and the reference voltage VREF is written into the second electrode of the capacitor C1. The second electrode of the capacitor C1 and the control terminal of the first transistor T1 may receive a voltage equal to the reference voltage VREF plus the threshold voltage (Vth) of the first transistor T1, so as to implement Vth compensation. Moreover, due to the ninth transistor T9 is turned off, the current driving unit 1011 is still turned off. Therefore, due to the signal written into the capacitor C1 during the data writing period WP does not involve the first power source PVDD, the pixel circuit 1010 will not have a programming voltage drop issue.

During a light emitting period EP after time t7 (and before time t1), a (driving) current Id flows from the first power source PVDD through the current driving unit 1011 to the second power source PVSS. That is, the current Id flows through the first transistor T1 and the ninth transistor T9 to the current driving unit 1011 from the first power source PVDD, and the current Id is determined by the voltage equal to the reference voltage VREF minus the data voltage Vdata. More specifically, the current Id may also be determined by the above formula (3).

Figure 11:
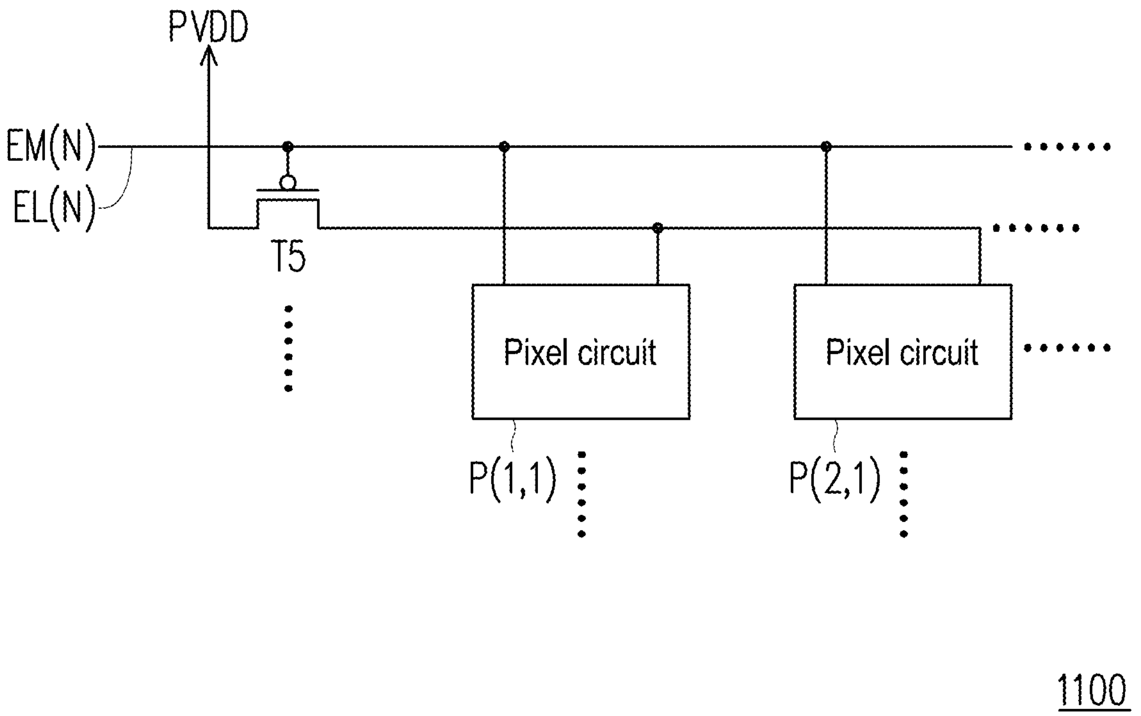
FIG. 11 to FIG. 17 are a plurality of schematic diagrams of an electronic device according to various embodiments of the disclosure.

FIG. 11 is a schematic diagram of an electronic device according to an embodiment of the disclosure. Referring to FIG. 11, the fifth transistor T5 may be coupled to one row of the plurality of pixel circuits P(1,1) to P(a, b). As shown in FIG. 11, the fifth transistor T5 is coupled between the plurality of pixel circuits P(1,1) to P(a, 1) and the first power source PVDD, and coupled to the same emission signal line EL(N) to receive the emission signal EM(N). Therefore, the electronic device 1100 may effectively save the number of the transistors. The pixel circuits 210, 310, 410, 510 of the embodiments of FIG. 2A, FIG. 3A, FIG. 4, FIG. 5 may be applied in the electronic device 1100.

Figure 12:
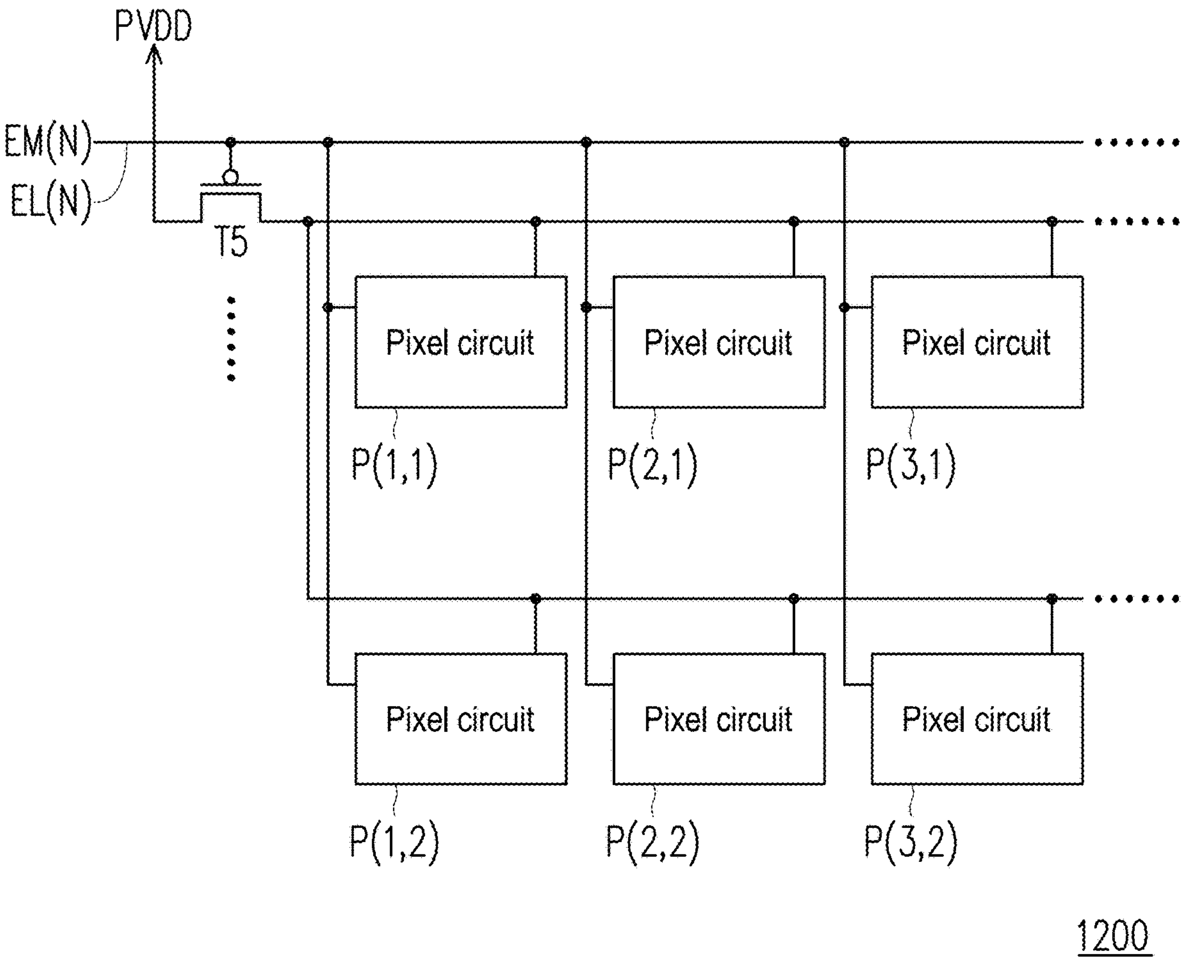

FIG. 12 is a schematic diagram of an electronic device according to an embodiment of the disclosure. Referring to FIG. 12, the fifth transistor T5 may be coupled to partial rows of the plurality of pixel circuits P(1,1) to P(a, b). As shown in FIG. 12, the fifth transistor T5 is coupled between the plurality of pixel circuits P(1,1) to P(a, 1) and P(1,2) to P(a, 2) and the first power source PVDD, and coupled to the same emission signal line EL(N) to receive the emission signal EM(N). The pixel circuits 210, 310, 410, 510 of the embodiments of FIG. 2A, FIG. 3A, FIG. 4, FIG. 5 may be applied in the electronic device 1200.

Figure 13:
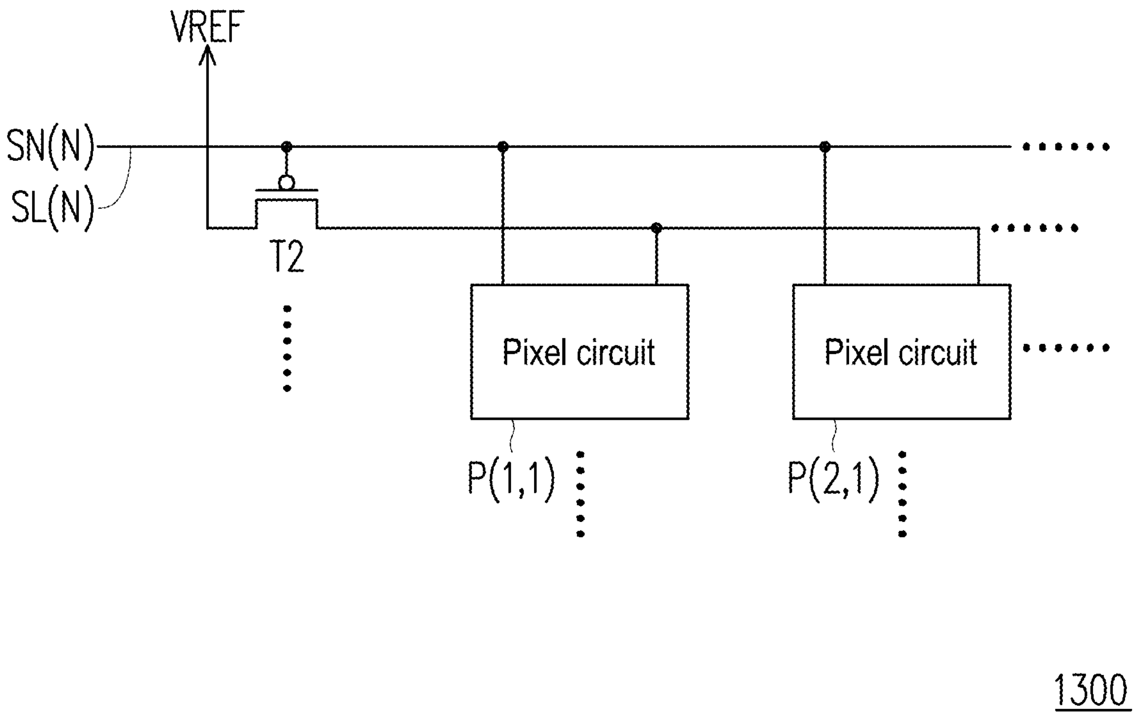

FIG. 13 is a schematic diagram of an electronic device according to an embodiment of the disclosure. Referring to FIG. 13, the second transistor T2 may be coupled to one row of the plurality of pixel circuits P(1,1) to P(a, b). As shown in FIG. 13, the second transistor T2 is coupled between the plurality of pixel circuits P(1,1) to P(a, 1) and the reference voltage VREF, and coupled to the same scan signal line SL(N) to receive the scan signal SN(N). The pixel circuits 210, 310, 410, 510 of the embodiments of FIG. 2A, FIG. 3A, FIG. 4, FIG. 5 may be applied in the electronic device 1300.

Figure 14:
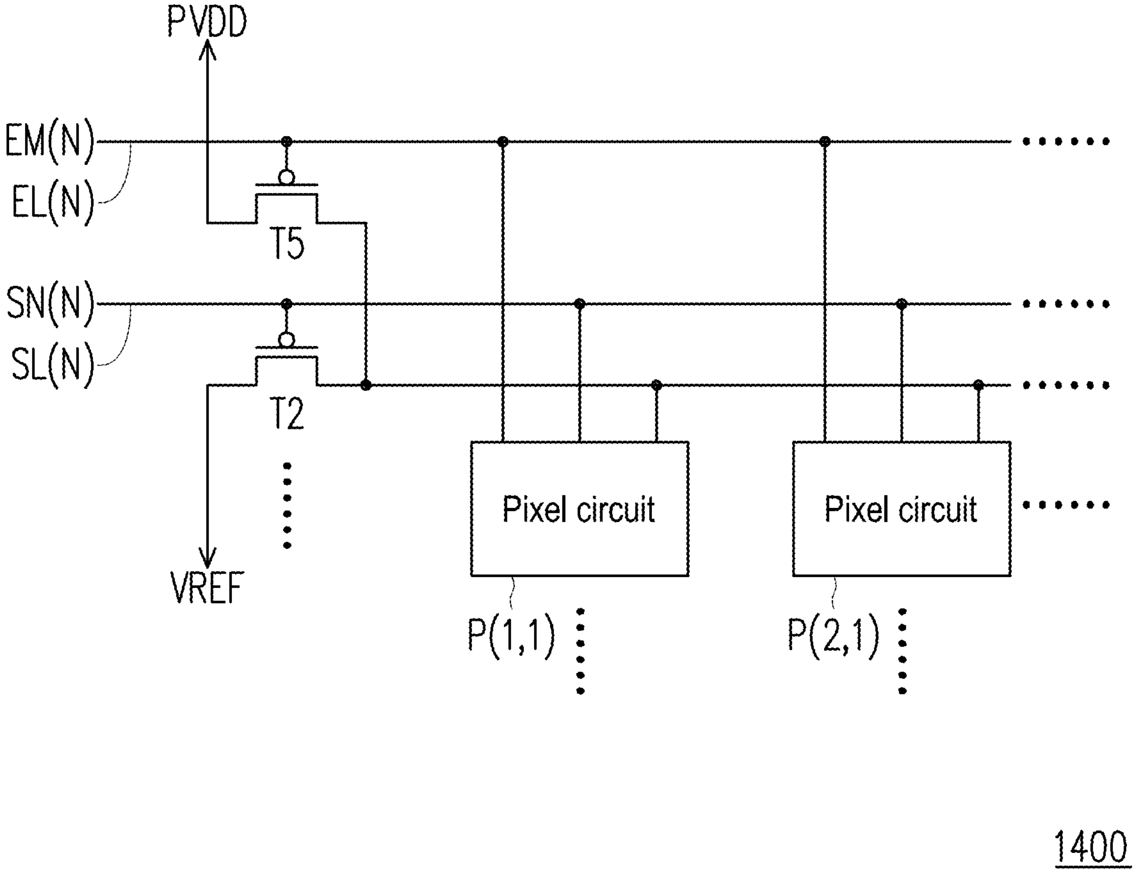

FIG. 14 is a schematic diagram of an electronic device according to an embodiment of the disclosure. Referring to FIG. 14, the second transistor T2 and the fifth transistor T5 may be coupled to one row of the plurality of pixel circuits P(1,1) to P(a, b). As shown in FIG. 14, the second transistor T2 is coupled between the plurality of pixel circuits P(1,1) to P(a, 1) and the reference voltage VREF, and coupled to the same scan signal line SL(N) to receive the scan signal SN(N). The fifth transistor T5 is coupled between the plurality of pixel circuits P(1,1) to P(a, 1) and the first power source PVDD. The plurality of pixel circuits P(1,1) to P(a, 1) may be coupled to the same emission signal line EL(N) to receive the emission signal EM(N). The pixel circuits 210, 310, 410, 510 of the embodiments of FIG. 2A, FIG. 3A, FIG. 4, FIG. 5 may be applied in the electronic device 1400.

Figure 15:
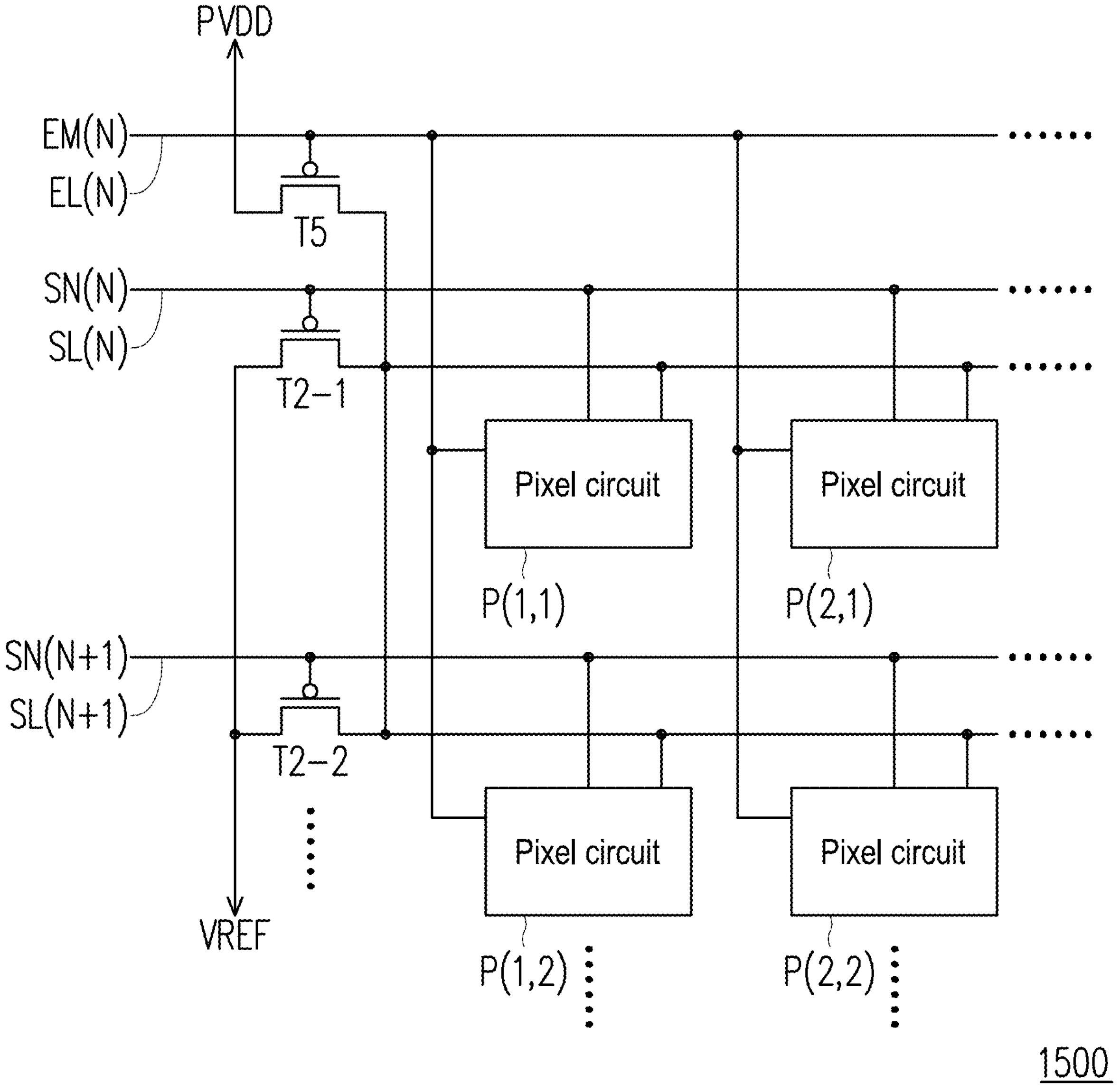

FIG. 15 is a schematic diagram of an electronic device according to an embodiment of the disclosure. Referring to FIG. 15, the second transistor T2-1 and the fifth transistor T5 may be coupled to one row of the plurality of pixel circuits P(1,1) to P(a, b) and the second transistor T2-2 and the fifth transistor T5 may be coupled to another one row of the plurality of pixel circuits P(1,1) to P(a, b). As shown in FIG. 15, the second transistor T2-1 is coupled between the plurality of pixel circuits P(1,1) to P(a, 1) and the reference voltage VREF, and the second transistor T2-2 is coupled between the plurality of pixel circuits P(1,2) to P(a, 2) and the reference voltage VREF. The plurality of pixel circuits P(1,1) to P(a, 1) may be coupled to the same scan signal line SL(N) to receive the scan signal SN(N), and the plurality of pixel circuits P(1,2) to P(a, 2) may be coupled to the same another scan signal line SL(N+1) to receive the scan signal SN(N+1). The fifth transistor T5 is coupled between the plurality of pixel circuits P(1,1) to P(a, 1) and P(1,2) to P(a, 2) and the first power source PVDD, and coupled to the same emission signal line EL(N) to receive the emission signal EM(N). The pixel circuits 210, 310, 410, 510 of the embodiments of FIG. 2A, FIG. 3A, FIG. 4, FIG. 5 may be applied in the electronic device 1500.

Figure 16:
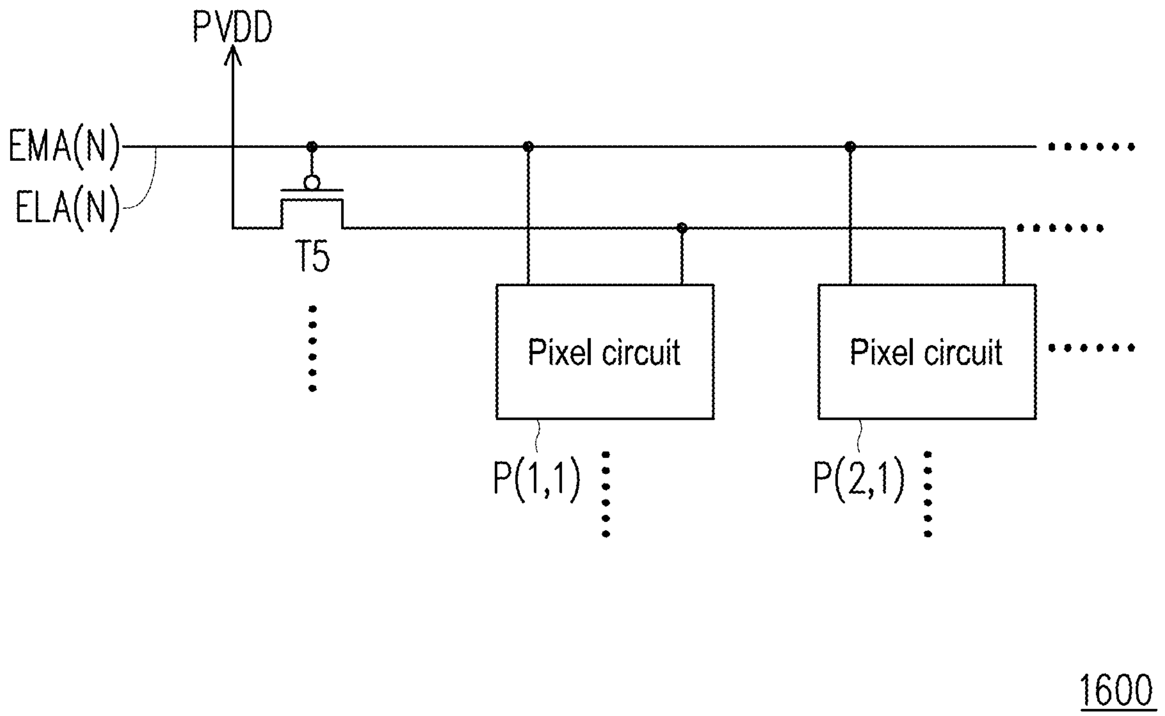

FIG. 16 is a schematic diagram of an electronic device according to an embodiment of the disclosure. Referring to FIG. 16, the fifth transistor T5 may be coupled to one row of the plurality of pixel circuits P(1,1) to P(a, b). As shown in FIG. 16, the fifth transistor T5 is coupled between the plurality of pixel circuits P(1,1) to P(a, 1) and the first power source PVDD, and coupled to the same emission signal line ELA(N) to receive the emission signal EMA(N). The pixel circuits 710 and 810 of the embodiments of FIG. 7A and FIG. 8 may be applied in the electronic device 1600.

Figure 17:
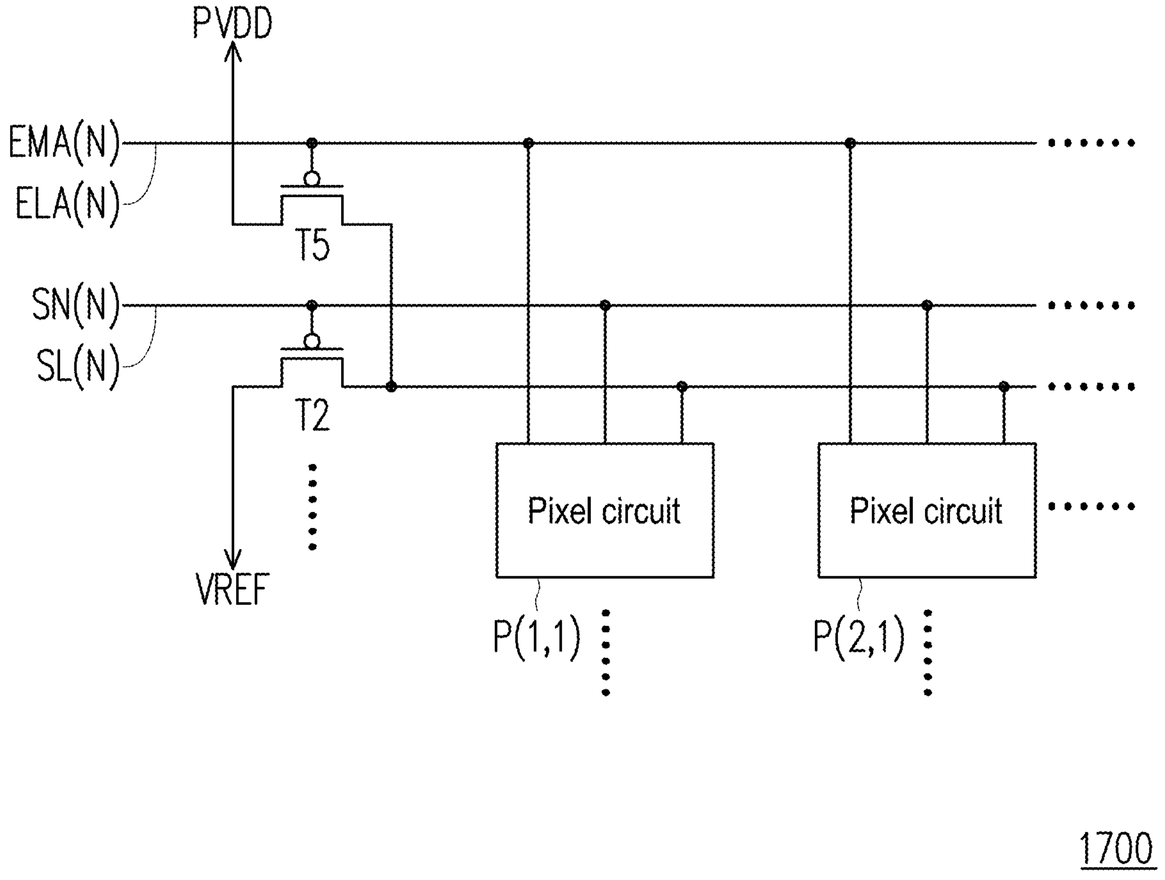

FIG. 17 is a schematic diagram of an electronic device according to an embodiment of the disclosure. Referring to FIG. 17, the second transistor T2 and the fifth transistor T5 may be coupled to one row of the plurality of pixel circuits P(1,1) to P(a, b). As shown in FIG. 17, the second transistor T2 is coupled between the plurality of pixel circuits P(1,1) to P(a, 1) and the reference voltage VREF, and coupled to the same scan signal line SL(N) to receive the scan signal SN(N). The fifth transistor T5 is coupled between the plurality of pixel circuits P(1,1) to P(a, 1) and the first power source PVDD, and coupled to the same emission signal line ELA(N) to receive the emission signal EMA(N). The pixel circuits 710 and 810 of the embodiments of FIG. 7A and FIG. 8 may be applied in the electronic device 1700.

In summary, the electronic device of the disclosure may effectively prevent the programming voltage drop problem and the emitting voltage drop problem during the data writing period and the emission period. Moreover, the electronic device may further reduce the number of transistors to effectively reduce cost and layout area.

What is claimed is:

1. An electronic device, comprising:

a first transistor, comprising a first terminal, a second terminal, and a control terminal;

a second transistor, coupled to the first terminal, and configured to receive a reference voltage;

a capacitor, coupled to the control terminal, and comprising a first electrode and a second electrode;

a third transistor, coupled to the first electrode, and configured to receive a data signal;

a fourth transistor, coupled to the second electrode and the second terminal;

a fifth transistor, coupled to the first terminal and a first power source;

a sixth transistor, coupled to the second electrode, and configured to receive a reset voltage; and a seventh transistor, coupled to the first terminal and the first electrode; and a current driving unit, coupled to the second terminal and a second power source, wherein during a reset period, a first signal is written into the first electrode, and the reset voltage is written into the second electrode, wherein during a data writing period, the data voltage is written into the first electrode, and the reference voltage is written into the second electrode, wherein during a light emitting period, the first terminal is coupled to the first electrode, and a current flows from the first power source through the current driving unit to the second power source, wherein a voltage value of the first signal is higher than or equal to a maximum voltage value of the data signal.

2. The electronic device according to claim 1, further comprising:

a ninth transistor, coupled to the second terminal and the current driving unit.

3. The electronic device according to claim 2, wherein the ninth transistor is further coupled to another emission signal line to receive another emission signal.

4. The electronic device according to claim 3, wherein the emission signal and the another emission signal have a high voltage level during the data writing period.

5. The electronic device according to claim 3, wherein the ninth transistor is further coupled to the another emission signal line of a previous row pixel to receive the another emission signal.

6. The electronic device according to claim 2, wherein the ninth transistor is further coupled to an emission signal line to receive an emission signal.

7. The electronic device according to claim 1, further comprising:

a plurality of pixel circuits, each of the plurality of pixel circuits comprises the first transistor, the second transistor, the third transistor, the fourth transistor, the sixth transistor, and the seventh transistor, wherein the fifth transistor is coupled to the plurality of pixel circuits.

8. The electronic device according to claim 7, wherein the fifth transistor is coupled to one row of the plurality of pixel circuits.

9. The electronic device according to claim 7, wherein the fifth transistor is coupled to partial rows of the plurality of pixel circuits.

10. The electronic device according to claim 1, further comprising:

a plurality of pixel circuits, each of the plurality of pixel circuits comprises the first transistor, the third transistor, the fourth transistor, the fifth transistor, the sixth transistor, and the seventh transistor, wherein the second transistor is coupled to the plurality of pixel circuits.

11. The electronic device according to claim 10, wherein the second transistor is coupled to one row of the plurality of pixel circuits.

12. The electronic device according to claim 1, wherein a first terminal of the fifth transistor is coupled to the first power source, and a second terminal of the fifth transistor is coupled to first terminals of the seventh transistor and the first transistor.

13. The electronic device according to claim 1, further comprising:

an eighth transistor, coupled to the first electrode, and configured to receive another reset voltage, wherein the another reset voltage is equal to the voltage of the first signal.

14. The electronic device according to claim 1, further comprising:

an eighth transistor, coupled to an emission signal line, and configured to receive an emission signal, wherein the high voltage level of the emission signal is equal to the voltage of the first signal.

15. The electronic device according to claim 1, further comprising:

a plurality of pixel circuits, each of the plurality of pixel circuits comprises the first transistor, the third transistor, the fourth transistor, the sixth transistor, and the seventh transistor, wherein the second transistor and the fifth transistor are coupled to the plurality of pixel circuits.

16. The electronic device according to claim 1, wherein the first transistor, second transistor, the third transistor, the fourth transistor, the fifth transistor, the sixth transistor, and the seventh transistor are p-type transistors.

17. The electronic device according to claim 1, further comprising:

an eighth transistor, coupled to the first electrode, wherein the sixth transistor and the eighth transistor are coupled to a reset signal line to receive a reset signal.

18. The electronic device according to claim 1, further comprising:

an eighth transistor, coupled to the first electrode, wherein the sixth transistor and the eighth transistor are coupled to another scan signal line of a previous row pixel to receive another scan signal from.

19. The electronic device according to claim 1, wherein a first terminal of the sixth transistor is coupled to a control terminal of the sixth transistor.

20. The electronic device according to claim 1, wherein the electronic device is a display device.

* * * * *